(12) United States Patent
Kwon et al.

(10) Patent No.: US 11,329,578 B2
(45) Date of Patent: May 10, 2022

(54) DEVICE FOR DRIVING A PLURALITY OF MOTORS AND ELECTRIC APPARATUS INCLUDING THE SAME

(71) Applicant: LG ELECTRONICS INC., Seoul (KR)

(72) Inventors: Sunku Kwon, Seoul (KR); Chaseung Jun, Seoul (KR); Sehwa Choe, Seoul (KR); Wookjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/987,628

(22) Filed: Aug. 7, 2020

(65) Prior Publication Data

US 2021/0044224 A1 Feb. 11, 2021

(30) Foreign Application Priority Data

Aug. 8, 2019 (KR) .................. 10-2019-0096971
Aug. 8, 2019 (KR) .................. 10-2019-0096972

(51) Int. Cl.
*H02P 21/24* (2016.01)
*H02P 5/50* (2016.01)
*H02P 21/22* (2016.01)

(52) U.S. Cl.
CPC ............ *H02P 5/50* (2013.01); *H02P 21/22* (2016.02); *H02P 2201/03* (2013.01); *H02P 2209/01* (2013.01)

(58) Field of Classification Search
CPC ........ H02P 5/50; H02P 21/22; H02P 2201/03; H02P 2209/01; H02P 27/08; H02P 5/74; H02P 27/085
See application file for complete search history.

(56) References Cited

U.S. PATENT DOCUMENTS 9,595,904 B2 * 3/2017 Lee .................. H02M 7/5395
2002/0030462 A1 * 3/2002 Matsushiro ............ H02P 6/085
318/727

(Continued)

FOREIGN PATENT DOCUMENTS

CN   106849794   6/2017
DE   103 42 049   5/2005

(Continued)

OTHER PUBLICATIONS

International Search Report in PCT/KR2020/010478, dated Dec. 2, 2020 (3 pages).

(Continued)

*Primary Examiner* — Muhammad S Islam
(74) *Attorney, Agent, or Firm* — Birch, Stewart, Kolasch & Birch, LLP

(57) ABSTRACT

A device for driving a plurality of motors and an electric apparatus having the same is disclosed. The device includes an inverter connected to a DC terminal, a multi-phase motor connected to the inverter, a single-phase motor serially connected to the multi-phase motor, and a first capacitor and a second capacitor connected in series between a first end and a second end of the DC terminal, wherein the single-phase motor is connected to the multi-phase motor, and a node between the first capacitor and the second capacitor. Accordingly, a plurality of motors serially connected with each other can be driven by using a single inverter.

20 Claims, 44 Drawing Sheets

(56) References Cited

U.S. PATENT DOCUMENTS

| | | | |
|---|---|---|---|
| 2007/0158948 A1 | 7/2007 | Oyobe et al. | |
| 2015/0128660 A1* | 5/2015 | Jung | D06F 34/10 |
| | | | 68/3 R |
| 2015/0194922 A1* | 7/2015 | Sato | G01R 31/14 |
| | | | 318/504 |
| 2017/0070172 A1* | 3/2017 | Je | H02M 7/00 |
| 2018/0006586 A1 | 1/2018 | Pu | |
| 2018/0062551 A1* | 3/2018 | Moon | H02M 7/5387 |
| 2018/0091083 A1* | 3/2018 | Satou | H02P 27/06 |

FOREIGN PATENT DOCUMENTS

| | | |
|---|---|---|
| EP | 1 732 203 | 12/2006 |
| JP | H0-970198 | 3/1997 |
| JP | 2003-018887 | 1/2003 |
| JP | 2009-159658 | 7/2009 |
| KR | 10-2017-0087271 A | 7/2017 |

OTHER PUBLICATIONS

Communication and Search Report, issued from the European Patent Office in Application No. 20190097.4, dated Dec. 23, 2020 (9 pages).

Chen, Alian et al., Single-Phase Hybrid Clamped Three-Level Inverter Based Photovoltaic Generation System, 2010 $2^{nd}$ IEEE International Symposium on Power Electronics for Distributed Generation Systems, Jun. 16, 2010, pp. 635-638.

Examination Report in Australian Patent Application No. 2020213391, dated Mar. 5, 2021 (8 pages).

Zhicai, X., et al., "Active disturbance rejection control strategy for symmetrical six-phase and three-phase PMSM two-motor series-connected system." 12th IEEE International Conference on Electronic Measurement & Instruments, 2015, vol. 3, pp. 1354-1358.

* cited by examiner

DEVICE FOR DRIVING A PLURALITY OF MOTORS AND ELECTRIC APPARATUS INCLUDING THE SAME

CROSS-REFERENCE TO RELATED APPLICATIONS

This application claims priority under 35 USC § 119 to Korean Application No. 10-2019-0096971, filed on Aug. 8, 2019, and Korean Application No. 10-2019-0096972, filed on Aug. 8, 2019. The disclosure of the foregoing applications are hereby incorporated by reference in their entirety.

TECHNICAL FIELD

The present disclosure relates to a device for driving a plurality of motors and an electric apparatus having the same, and more particularly, to a device for driving a plurality of motors serially connected with each other by using a single inverter, and an electric apparatus having the same.

Meanwhile, the present disclosure relates to a device for driving a plurality of motors serially connected with each other in various modes by using a single inverter, and an electric apparatus having the same.

Meanwhile, the present disclosure relates to a device for stably driving a plurality of motors, while preventing the reduction of the voltage utilization of an inverter by using a single inverter, and an electric apparatus having the same.

BACKGROUND

A motor driving device is a device for driving a motor having a rotor that rotates and a stator wound around with a coil.

In recent years, in electric apparatuses, the use of motor is increasing, and in particular, a plurality of motors are employed to perform respective operations.

In order to drive a plurality of motors, when an inverter that supplies AC power to each of the motors, and a processor or microcomputer that controls the inverter are used, due to an increase in the number of inverters or an increase in the number of processors or microcomputers, an efficient structural design of an electric apparatus is difficult, and the manufacturing cost increases.

Meanwhile, for driving a plurality of motors, "IEEE Transactions on Industrial Electronics, vol. 62, no. 10, pp. 6096-6107, 2015" discloses a method of driving a plurality of three-phase motors by using a common inverter.

However, according to this method, since the same current flows through a plurality of three-phase motors, the plurality of three-phase motors rotate at the same speed. Accordingly, it is impossible to drive the motors at different speeds.

Meanwhile, for driving a plurality of motors, Korean Patent Application No. 10-2018-0025167 discloses that a plurality of motors are driven by using a single inverter, while a relay for switching is provided between the inverter and any a single motor.

According to this method, when the relay is turned on, a plurality of motors are driven in the same direction at the same speed by the same current, and when the relay is turned off, the plurality of motors are rotated in different directions at the same speed. Accordingly, it is impossible to drive motors at different speeds, when a plurality of motors are operated.

Meanwhile, Korean Patent Publication No. 10-2017-0087271 discloses that, for driving a plurality of motors, a plurality of motors are connected in parallel by using a single inverter.

However, according to this method, since a plurality of motors are connected in parallel, and the current output from the inverter is distributed to each motor, the voltage utilization of the inverter decreases to almost half, and voltage imbalance may occur in between the plurality of capacitors disposed in a DC terminal. According to the imbalance, the driving efficiency of the motor may be reduced due to current harmonics, torque pulsation of the motor, speed pulsation of the motor, or noise increase, or the like. In addition, it is difficult to simultaneously drive a plurality of motors at different speeds.

SUMMARY

The present disclosure has been made in view of the above problems, and provides a device for driving a plurality of motors serially connected with each other by using a single inverter, and an electric apparatus having the same.

The present disclosure further provides a device for driving a plurality of motors serially connected with each other in various modes by using a single inverter, and an electric apparatus having the same.

The present disclosure further provides a motor driving device which can stably drive a plurality of motors while preventing a reduction in voltage utilization of inverter by using a single inverter, and an electric apparatus having the same.

A device for driving a plurality of motors and an electric apparatus having the same according to an embodiment of the present disclosure include an inverter connected to a DC terminal, a multi-phase motor connected to the inverter, a single-phase motor serially connected to the multi-phase motor, and a first capacitor and a second capacitor serially connected to both ends of the DC terminal, wherein the single-phase motor is connected to the multi-phase motor, and a node between the first capacitor and the second capacitor.

Meanwhile, a neutral point of the multi-phase motor is connected to one end of the single phase motor, and the other end of the single-phase motor is connected to the node between the first capacitor and the second capacitor.

Meanwhile, an input terminal of the single-phase motor is electrically connected to a node to which each phase of the multi-phase motor is commonly connected, and an output terminal no of the single-phase motor is connected to the node between the first capacitor and the second capacitor.

Meanwhile, a neutral point of the multi-phase motor is connected to one end of the single phase motor, and a DC terminal neutral point, which is the node between the first capacitor and the second capacitor, is connected to the other end of the single-phase motor.

Meanwhile, the motor neutral point of the multi-phase motor is a node where current becomes zero according to a phase difference in a multi-phase AC system.

Meanwhile, a device for driving a plurality of motors and an electric apparatus having the same according to an embodiment of the present disclosure may further include a first current detector configured to detect a first current input to the multi-phase motor; and a second current detector configured to detect a second current input to the single-phase motor.

Meanwhile, a device for driving a plurality of motors and an electric apparatus having the same according to an embodiment of the present disclosure may further include a first voltage detector configured to detect a DC voltage across both ends of the first capacitor, and a second voltage detector configured to detect a DC voltage across both ends of the second capacitor.

Meanwhile, the current output from the inverter corresponds to a single sine wave, when driving the single-phase motor and the multi-phase motor at the same speed, and corresponds to a sum of a plurality of sine waves, when driving the single-phase motor and the multi-phase motor at different speeds.

Meanwhile, a device for driving a plurality of motors and an electric apparatus having the same according to an embodiment of the present disclosure may further include a controller configured to control the inverter, and the controller controls to drive the single-phase motor and the multi-phase motor at a same speed, to drive the single-phase motor and the multi-phase motor at different speeds, to drive only the single-phase motor, or to drive only the multi-phase motor.

Meanwhile, the number of a frequency of a current input to the multi-phase motor, when driving the single-phase motor and the multi-phase motor at the same speed, is smaller than the number of a frequency of a current input to the multi-phase motor, when driving the single-phase motor and the multi-phase motor at different speeds.

Meanwhile, the frequency of the current input to the multi-phase motor is one, when driving the single-phase motor and the multi-phase motor at the same speed, and the frequency of the current input to the multi-phase motor is two or more, when driving the single-phase motor and the multi-phase motor at different speeds.

Meanwhile, the current output from the inverter corresponds to a single sine wave, when driving the single-phase motor and the multi-phase motor at the same speed, and corresponds to a sum of a plurality of sine waves, when driving the single-phase motor and the multi-phase motor at different speeds.

Meanwhile, when driving the single-phase motor and the multi-phase motor at different speeds, the multi-phase motor rotates at a first speed corresponding to the first frequency of the first current input to the multi-phase motor, and the single-phase motor rotate at a second speed corresponding to the second frequency of the second current input to the single-phase motor.

Meanwhile, when driving the single-phase motor and the multi-phase motor at the same speed, the multi-phase motor and the single-phase motor are driven by an effective current of a same frequency.

Meanwhile, when driving the single-phase motor and the multi-phase motor at the same speed, in case a maximum level of an effective current of the multi-phase motor and a maximum level of an effective current of the single-phase motor are the same, a torque of the multi-phase motor is greater than a torque of the single-phase motor.

Meanwhile, when driving the single-phase motor and the multi-phase motor at different speeds, the multi-phase motor and the single-phase motor may be driven by effective currents of a different frequency.

Meanwhile, a device for driving a plurality of motors and an electric apparatus having the same according to an embodiment of the present disclosure may further include a first voltage detector configured to detect a DC voltage across both ends of the first capacitor, a second voltage detector configured to detect a DC voltage across both ends of the second capacitor, a first current detector configured to detect a first current input to the multi-phase motor, and a second current detector configured to detect a second current input to the single-phase motor.

Meanwhile, a device for driving a plurality of motors and an electric apparatus having the same according to an embodiment of the present disclosure may further include a controller, and the controller controls the frequency of the current input to the multi-phase motor to be one, when driving the single-phase motor and the multi-phase motor at the same speed, and controls the frequency of the current input to the multi-phase motor to be two or more, when driving the single-phase motor and the multi-phase motor at different speeds.

Meanwhile, the controller may calculate the neutral point voltage of the multi-phase motor.

Meanwhile, the operation period of the single-phase motor may be shorter than that of the multi-phase motor.

Meanwhile, when driving the single-phase motor and the multi-phase motor at different speeds, different currents flow through the multi-phase motor and the single-phase motor, and when driving only the multi-phase motor, a current flows through the multi-phase motor, and no current flows through the single-phase motor.

Meanwhile, when driving the single-phase motor and the multi-phase motor at different speeds, a first current having a first frequency and a second frequency is input to the multi-phase motor, and a second current having the second frequency is input to the single-phase motor.

Meanwhile, when driving the single-phase motor and the multi-phase motor at the same speed, a third current having a third frequency is input to the multi-phase motor, and a fourth current having the third frequency is input to the single-phase motor.

Meanwhile, a device for driving a plurality of motors and an electric apparatus having the same according to another embodiment of the present disclosure may further include a controller, and the controller controls to flow different currents through the multi-phase motor and the single-phase motor, when driving the single-phase motor and the multi-phase motor at different speeds, and controls to flow current through the multi-phase motor, and to flow no current through the single-phase motor.

Meanwhile, when driving at least the single-phase motor among the single-phase motor and the multi-phase motor, an electric potential between a motor neutral point of the multi-phase motor and a DC terminal neutral point between the first capacitor and the second capacitor is different, when driving only the multi-phase motor, an electric potential between the motor neutral point and the DC terminal neutral point is the same.

Meanwhile, a device for driving a plurality of motors and an electric apparatus having the same according to another embodiment of the present disclosure may further include a controller, and the controller controls an electric potential between a motor neutral point of the multi-phase motor and a DC terminal neutral point between the first capacitor and the second capacitor to be different, when driving at least the single-phase motor among the single-phase motor and the multi-phase motor, and controls an electric potential between the motor neutral point and the DC terminal neutral point to be the same, when driving only the multi-phase motor.

Meanwhile, the controller of the device for driving a plurality of motors according to another embodiment of the present disclosure may calculate the electric potential of the DC terminal neutral point, based on the first DC voltage detected by the first voltage detector and the second DC voltage detected by the second voltage detector, and may calculate the electric potential of the motor neutral point, based on the first current detected by the first current detector or the second current detected by the second current detector.

Meanwhile, when driving only the single-phase motor, all of upper switching elements of the inverter are turned on, or all of lower switching elements of the inverter are turned on.

Meanwhile, when driving only the single-phase motor, the phases of the current flowing in each phase of the multi-phase motor are the same.

Meanwhile, when driving only the single-phase motor, the sum of the currents flowing in each phase of the multi-phase motor flows in the single-phase motor.

Meanwhile, when all of upper switching elements of the inverter are turned on, or all of lower switching elements of the inverter are turned on, the level of current flowing in the single-phase motor is greater than the level of current flowing in each phase of the multi-phase motor.

Meanwhile, when driving only the single-phase motor, the first input current is input to the multi-phase motor, the effective current flowing through the multi-phase motor is zero, the second input current is input to the single-phase motor, and the effective current flowing through the multi-phase motor is second input current.

Meanwhile, when driving at least the multi-phase motor among the single-phase motor and the multi-phase motor, some of the upper-switching elements of the inverter are turned on, others are turned off, or some of the lower-switching elements of the inverter are turned on, and others are turned off.

Meanwhile, the multi-phase motor may include a fan motor, and the single-phase motor may include a pump motor.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
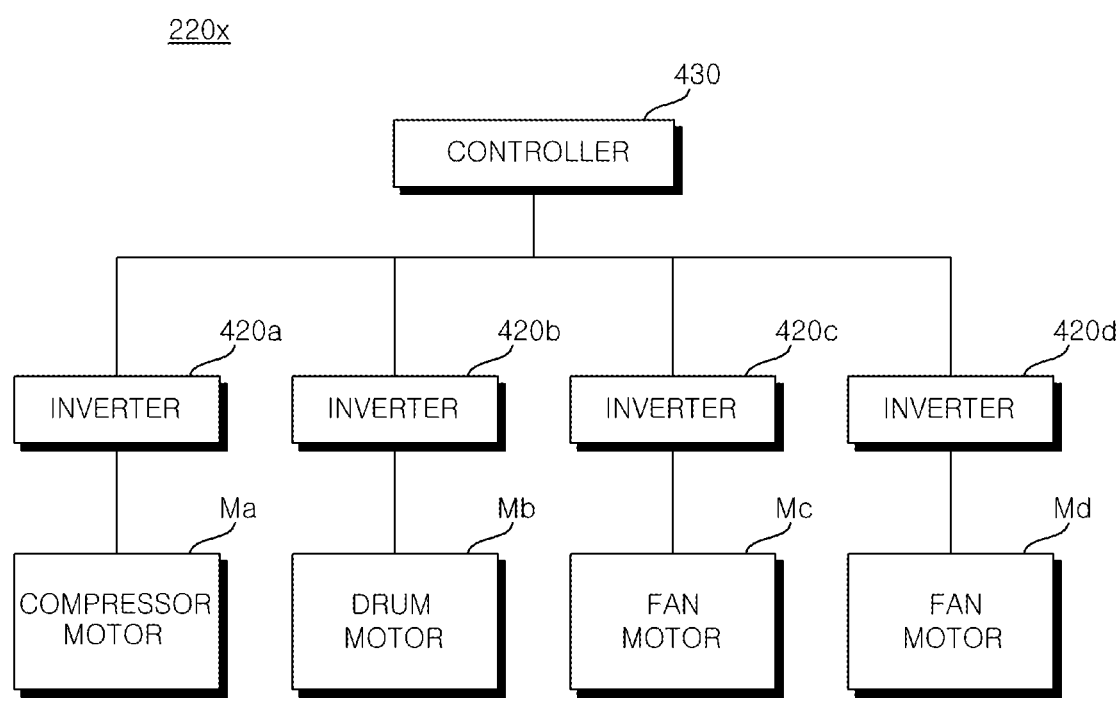
FIG. 1 is an example of a device for driving a plurality of motors.

FIG. 1 is an example of a device for driving a plurality of motors.

Referring to the drawing, a device $220x$ for driving a plurality of motors may include a single controller 430, a plurality of inverters $420a$ to $420d$, and a plurality of motors Ma to Md.

Each of the inverters $420a$ to $420d$ can individually drive each of the motors Ma to Md.

However, in this case, since the inverters require corresponding motors respectively, in some sense, there is unnecessary cost in terms of manufacturing cost. Accordingly, there is a need for a method of stably driving each motor while reducing the number of inverters rather than the number of motors.

FIGS. 2A to 4D are diagrams showing various motor driving devices.

Figure 2A:
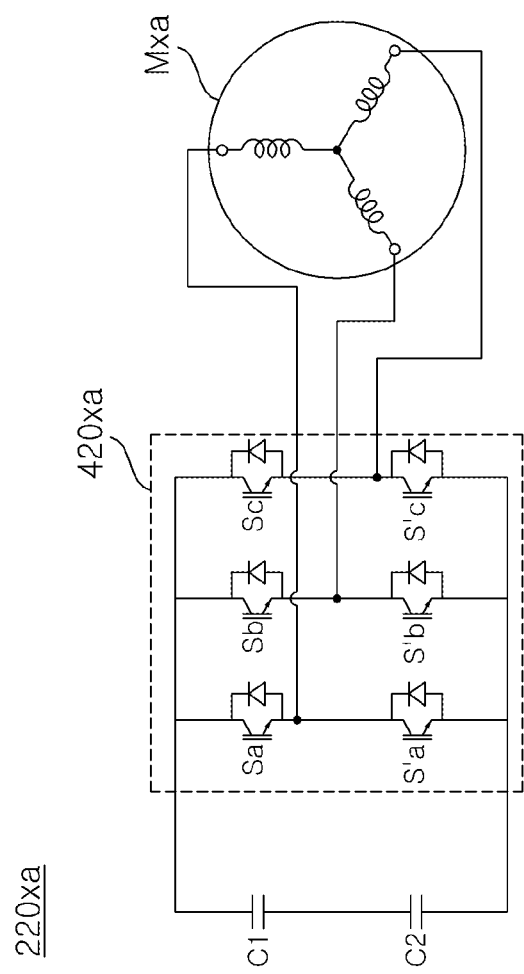
FIGS. 2A to 4F are diagrams showing various motor driving devices.

First, FIG. 2A illustrates a motor driving device $220xa$ including a three-phase motor Mxa and an inverter $420xa$ for driving the three-phase motor Mxa. At this time, the inverter $420xa$ may include six switching elements.

Figure 2B:
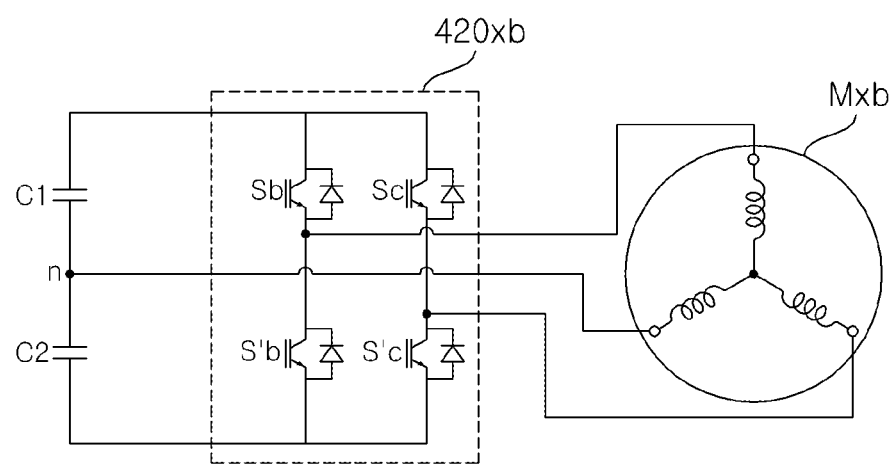

Next, FIG. 2B illustrates a motor driving device $220xb$ including a three-phase motor Mxb, and an inverter $420xb$ for driving the three-phase motor Mxb. In this case, the inverter $420xb$ may include four switching elements to reduce manufacturing cost.

Meanwhile, since the inverter $420xb$ has four switching elements, two phases of the three-phase motor Mxb are connected to the inverter $420xb$, but the remaining one phase is connected to a n-node that is a node between a plurality of DC terminal capacitors C1 and C2.

The voltage synthesized by the inverter $420xb$ for driving the motor is reduced to half the level of the inverter $420xa$ of FIG. 2A.

In addition, due to the current flowing through the n node which is a DC terminal neutral point, the voltage of the plurality of DC terminal capacitors C1 and C2 may be changed. Due to a difference in voltage between the DC terminal capacitors C1 and C2, a difference between a command voltage and the actually generated voltage may occur, and the output voltage of the inverter 420xb may be distorted. In addition, more harmonics may flow in the motor phase current due to the distortion of the output voltage from the inverter 420xb.

Figure 2C:
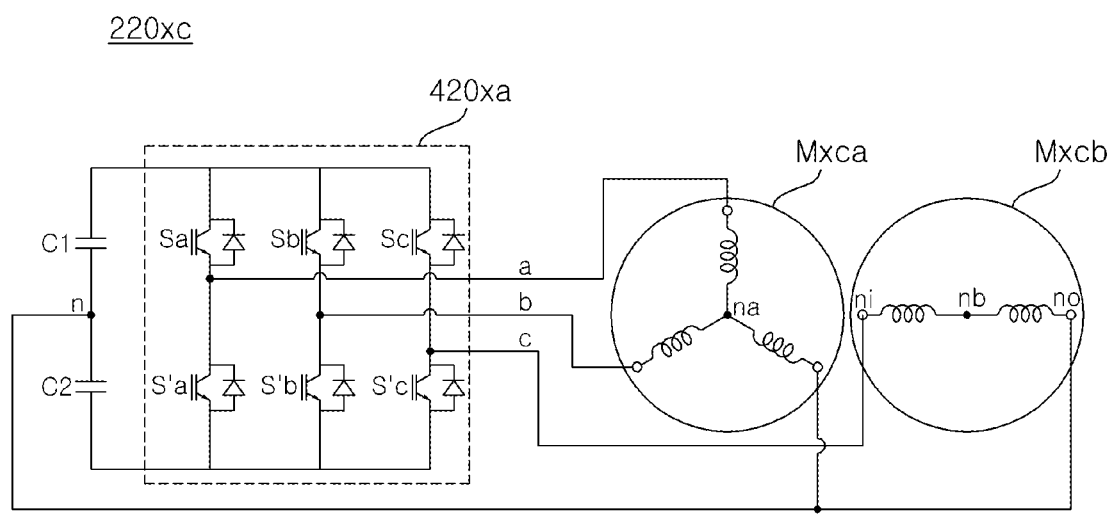

FIG. 2C illustrates a motor driving device 220xc that has the three-phase motor Mxca and the single-phase motor Mxcb which are connected in parallel to each other and includes a single inverter 420xc.

Referring to the drawing, the three-phase motor Mxca and the single-phase motor Mxcb are connected in parallel with each other to the inverter 420xc.

Specifically, a node and b node of the inverter 420xc are connected to a-phase coil and b-phase coil of the three-phase motor Mxca, and the c-phase coil is connected to the n-node that is a DC terminal neutral point.

Meanwhile, the na node, which is a motor neutral point of the three-phase motor Mxca, is not electrically connected to an external node separately.

Further, the input terminal of the single-phase motor Mxcb is connected to the c node of the inverter 420xc, and the output terminal of the single-phase motor Mxcb is connected to the n node which is the DC terminal neutral point.

Similarly to FIG. 2B, the three-phase motor Mxca of FIG. 2C is driven by four switching elements Sa, S'a, Sb, and S'b among the six switching elements of the inverter 420xc, and the single-phase motor Mxcb is driven by the remaining two switching elements Sc and S'c.

According to this method, since both the three-phase motor Mxca and the single-phase motor Mxcb are driven by some of the six switching elements of the inverter 420xc, the voltage utilization of the inverter 420xc is lowered to about half.

In addition, since the current flowing through the single-phase motor Mxcb flows to the n node which is the DC terminal neutral point, the voltage imbalance of the DC terminal capacitors C1 and C2 is intensified.

Meanwhile, when performing a control for suppressing such voltage imbalance, the inverter 420xc must perform a complementary control, and, consequently, the three-phase motor Mxca and the single-phase motor Mxcb cannot be operated independently.

Figure 3A:
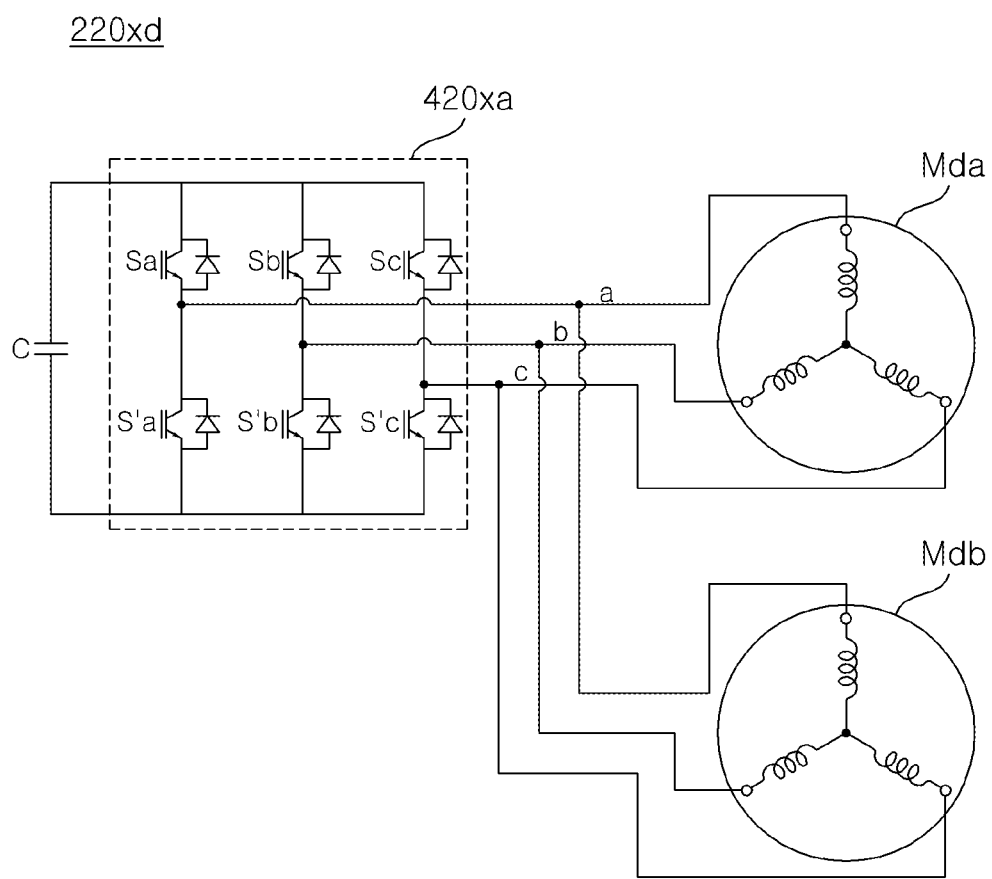

FIG. 3A illustrates a motor driving device 220xd having three-phase motors Mda and Mdb connected in parallel with each other to a single inverter 420xa.

According to this method, two three-phase motors Mda and Mdb have to operate at the same speed.

Figure 3B:
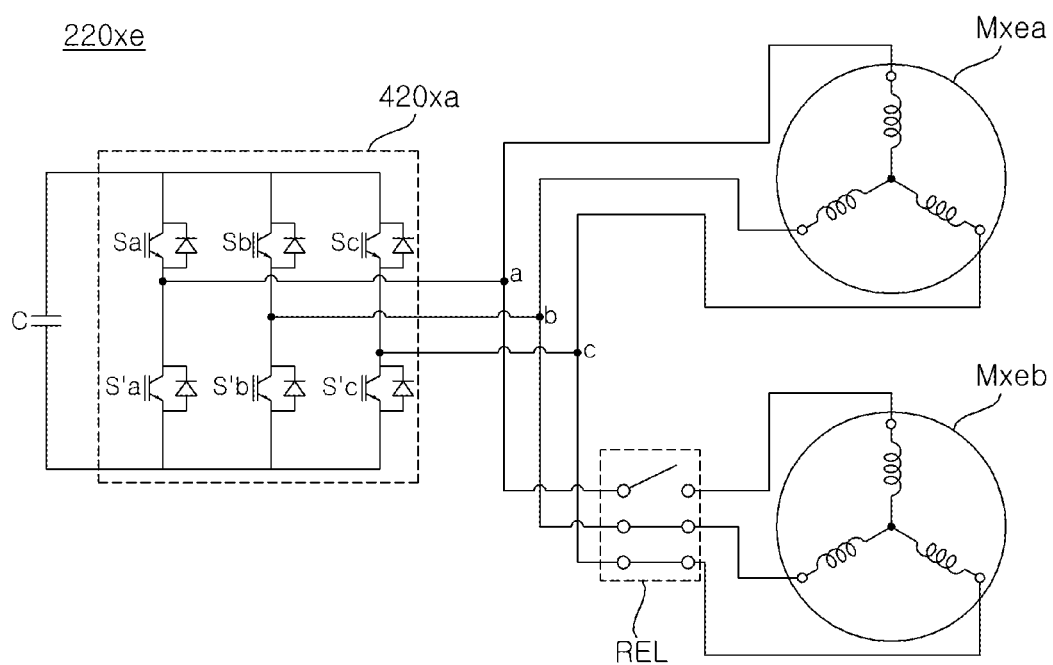

FIG. 3B illustrates a three-phase motor Mxea and Mxeb connected in parallel to each other to a single inverter 420xa, and a motor driving device 220xc having a relay REL that performs switching between the inverter 420xa and one motor Mxebb.

According to this method, when the relay REL is turned off, only one motor Mxea of the two three-phase motors Mxea and Mxeb is operated, and when the relay REL is turned on, two three-phase motors Mxea and Mxeb are operated at the same speed.

Meanwhile, according to this method, the three-phase motor Mxeb to which the relay is connected, among the two three-phase motors Mxea and Mxeb, cannot operate alone. In addition, the voltage utilization of the inverter 420xa is halved.

Figure 3C:
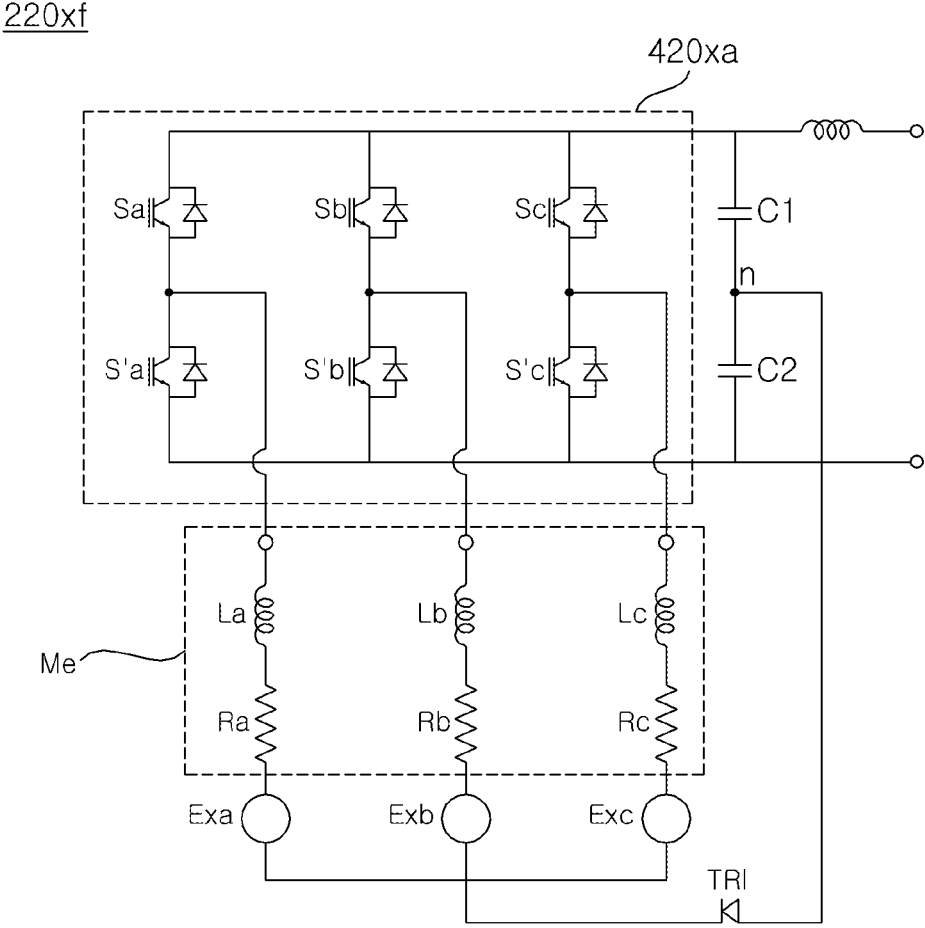

FIG. 3C illustrates a motor driving device 220xf having an inverter 420xa and a three-phase four-wire motor Me.

Generally, since the three-phase four-wire motor Me is driven in the same manner as the three-phase three-wire motor described above, no current flows through a winding connected to the neutral point n of the motor Me.

Therefore, the three phase windings of the motor are respectively connected to three legs of the inverter 420xa, similarly to the three phase three wire motor.

Meanwhile, the neutral point of the motor Me may be connected to the n-node which is the DC terminal neutral point, and TRIAC may be disposed as shown in the drawing in order to block current from flowing to the neutral point of the motor Me. Meanwhile, in addition to TRIAC, it is also possible to replace with another switch element or relay.

However, if an open accident occurs in a single phase of the phase windings of the motor Me, an element (such as TRIAC) connected to the neutral point of the motor may be conducted to form a new current path.

At this time, in a state where no current flows through the open winding, when an element (such as TRIAC) that blocks the neutral point current of the motor is conducted, current flows through the neutral point of the motor in place of the open phase. When a neutral point is used due to the open accident, the voltage utilization is lowered.

Figure 4A:
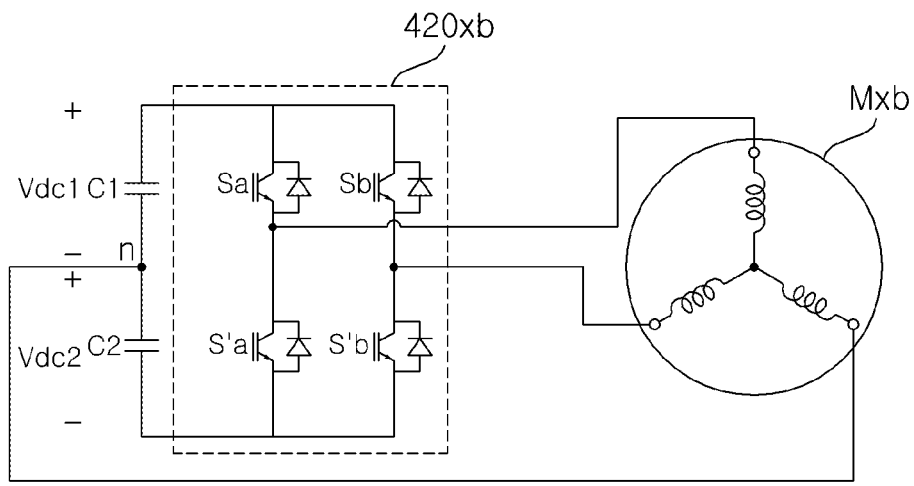

Next, as shown in FIG. 2B, FIG. 4A illustrates a motor driving device 220xb including a three-phase motor Mxb and an inverter 420xb for driving the three-phase motor Mxb. In this case, the inverter 420xb may include four switching elements to reduce manufacturing cost.

Figure 4B:
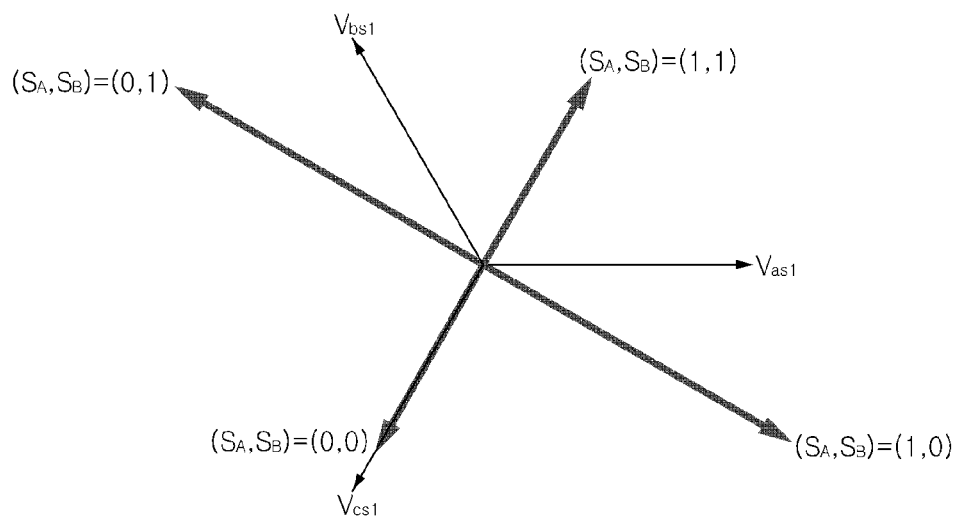

Meanwhile, FIG. 4B is a diagram showing a voltage vector synthesis for driving the three-phase motor Mxb of FIG. 4A.

Referring to the drawing, in the switch states of (0,0) and (1,1), there is a problem in that the voltage synthesized to the motor Mxb becomes half of the (1,0) and (0,1) switching states.

Figure 4C:
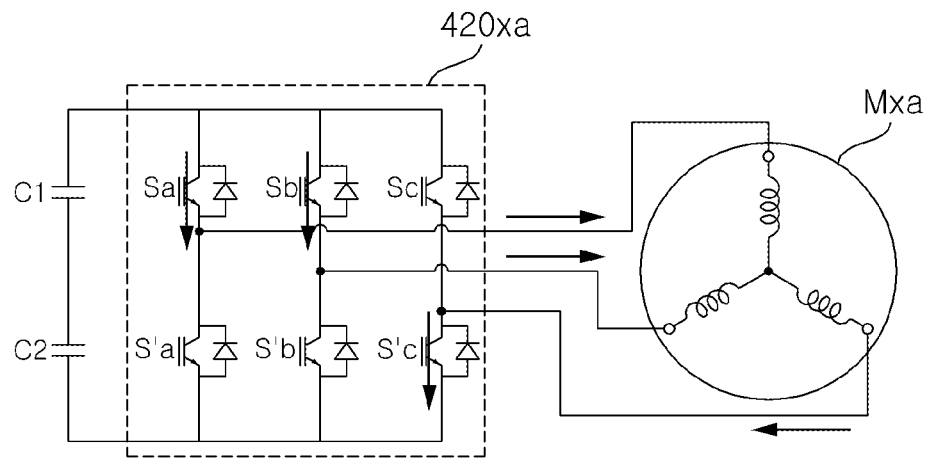

Meanwhile, as shown in FIG. 2A, FIG. 4C illustrates a motor driving device 220xa including a three-phase motor Mxa and an inverter 420xa for driving the three-phase motor Mxa. At this time, the inverter 420xa may include six switching elements.

Figure 4D:
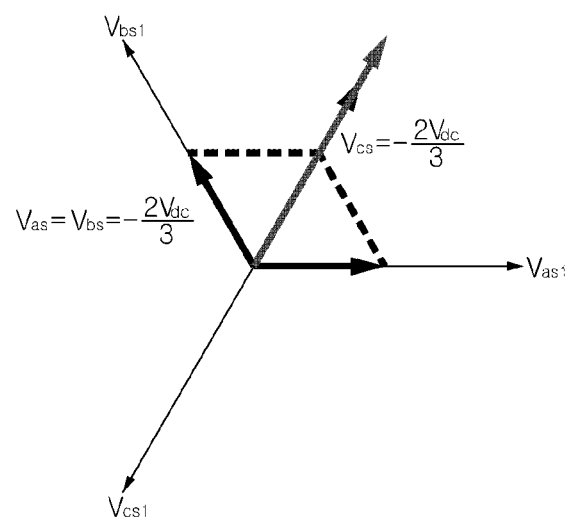

Meanwhile, FIG. 4D is a diagram illustrating voltage vector synthesis for driving the three-phase motor Mxa of FIG. 4C. In the drawing, voltage vector synthesis by the voltage vector of (1 1 0) is illustrated.

Meanwhile, since it is reduced to the minimum voltage synthesized by the inverter 420xb of FIG. 4A, there is a problem in that the voltage utilization of the inverter 420xb of FIG. 4A is approximately halved in comparison with the inverter 420xa of FIG. 4C.

Meanwhile, in a state where the voltage Vdc1 of both ends of the first capacitor C1 and the voltage Vdc2 of both ends of the second capacitor C2 are balanced as Vdc/2, the total DC voltage becomes Vdc, and the maximum voltage of one phase that the switching vector of the inverter 420xb synthesizes in the (1,1) state is Vdc/3.

Meanwhile, the maximum voltage of one phase synthesized in the (1,1,0) state of the inverter 420xa in FIG. 4C corresponding to the state in which the switching vector of the inverter 420xb in FIG. 4A is (1,1) is 2*Vdc/3.

Figure 4E:
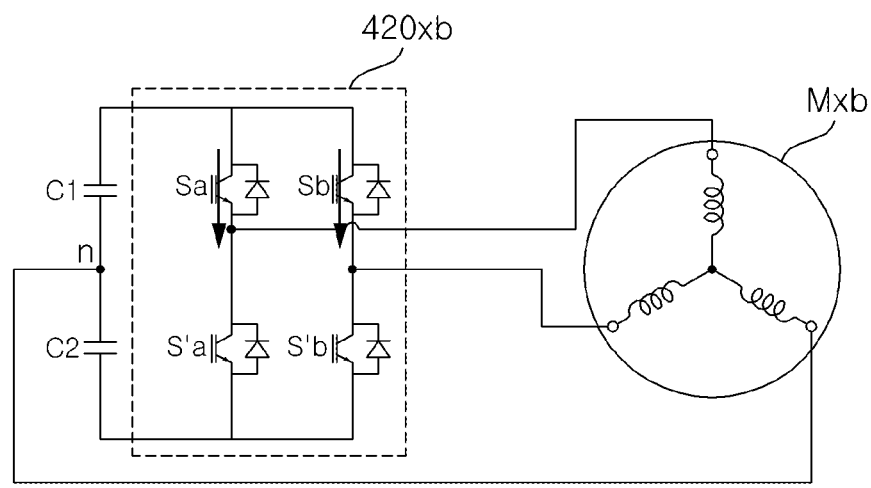

Meanwhile, FIG. 4E illustrates that switching by the switching vector of (1, 1) is performed in the motor driving device 220xb of FIG. 4A.

Figure 4F:
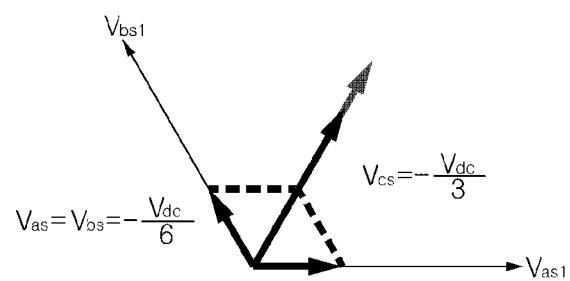

Meanwhile, FIG. 4F is a diagram showing the voltage vector synthesis of the switching vector of (1, 1) of FIG. 4E.

When the voltages of the upper and lower capacitors C1 and C2 of the inverter 420xb are unbalanced, the maximum voltage of one phase that the inverter 420xb synthesizes becomes the smaller voltage among Vdc1/3 at (1,1) and Vdc2/3 at (0,0).

Meanwhile, according to FIG. 4A or 4E, since the neutral point current always flows, the voltage imbalance of the upper and lower capacitors C1 and C2 inevitably occurs, so that the actual voltage utilization is reduced to a half or less.

Thus, since there constantly exists a problem of lowering the voltage utilization, the voltage utilization of the inverter 420xb decreases even when the single-phase motor Mxb is not driven by the inverter 420xb.

Hereinafter, a device for driving a plurality of motors according to an embodiment of the present disclosure to solve the disadvantages of FIGS. 2A to 4F is illustrated.

Figure 5:
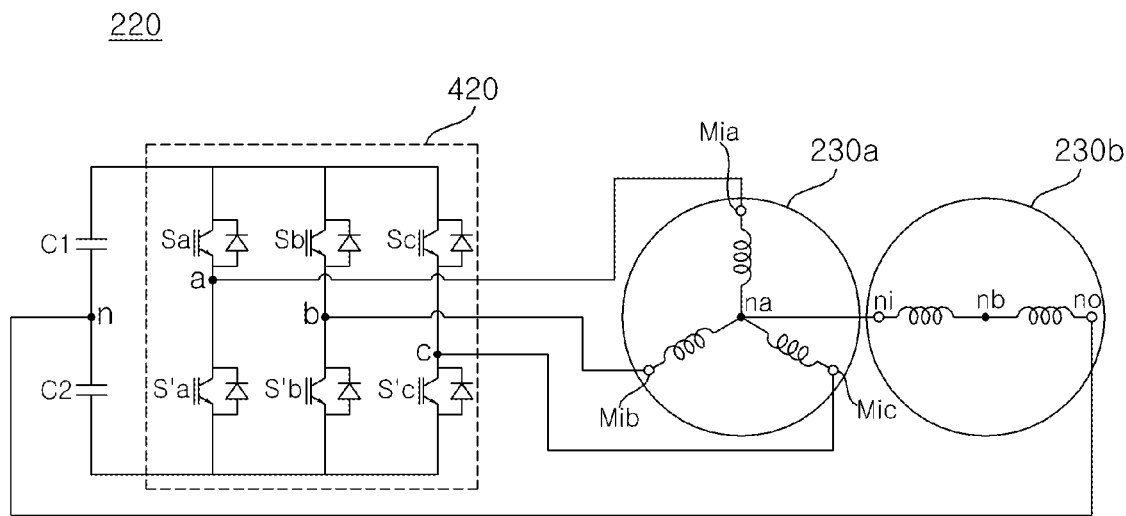
FIG. 5 is an example of an internal circuit diagram of a device for driving a plurality of motors according to an embodiment of the present disclosure.

FIG. 5 is an example of an internal circuit diagram of a device for driving a plurality of motors according to an embodiment of the present disclosure.

Referring to the drawing, a device for driving a plurality of motors 220 according to an embodiment of the present disclosure may include an inverter 420 connected to a DC terminal (x-y terminal), a multi-phase motor 230a connected to the inverter 420, and a single-phase motor 230b serially connected to the multi-phase motor 230a.

Meanwhile, the device for driving a plurality of motors 220 according to the embodiment of the present disclosure may be referred to as a multi-motor driver.

Meanwhile, since the multi-phase motor 230a is connected to the inverter 420, and the single-phase motor 230b is serially connected to the multi-phase motor 230a, finally, the multi-phase motor 230a and the single-phase motor 230b are connected to the inverter 420 in series.

Thus, in the device for driving a plurality of motors 220 according to the embodiment of the present disclosure has high voltage utilization, in comparison with the three-phase motor Mxca and the single-phase motor Mxcb of FIG. 2C.

Meanwhile, by using a single inverter 420, it is possible to significantly reduce the manufacturing cost, in comparison with the case of using a plurality of inverters for driving a plurality of motors.

Meanwhile, the device for driving a plurality of motors 220 according to the embodiment of the present disclosure may further include a first capacitor C1 and a second capacitor C2 serially connected to both ends of the DC terminal (x-y terminal). Accordingly, a DC terminal neutral point n may be formed between the first capacitor C1 and the second capacitor C2.

Meanwhile, a node, b node, c node inside the inverter 420 are electrically connected to a-phase coil terminal Mia, b-phase coil terminal Mib, and c-phase coil terminal Mic of the multi-phase motor 230a, respectively.

In addition, the single-phase motor 230b is connected to the multi-phase motor 230a, and a node n between the first capacitor C1 and the second capacitor C2.

Meanwhile, the node between the first capacitor C1 and the second capacitor C2 may be referred to as a DC terminal neutral point n or an inverter neutral point n.

That is, the neutral point na of the multi-phase motor 230a is connected to one end ni of the single-phase motor 230b, and the other end no of the single-phase motor 230b is connected to the DC terminal neutral point n which is a node between the first capacitor C1 and the second capacitor C2. Meanwhile, with respect to the DC terminal neutral point n, it is preferable that the capacitances of the first capacitor C1 and the second capacitor C2 are the same.

Meanwhile, the input terminal ni of the single-phase motor 230b is electrically connected to the node na to which each phase of the multi-phase motor 230a is commonly connected, and the output terminal no of the single-phase motor 230b is connected to the DC terminal neutral point n which is a node between the first capacitor C1 and the second capacitor C2.

Meanwhile, the node na to which each phase (e.g. three-phase) of the multi-phase motor 230a is commonly connected may be referred to as a motor neutral point na of the multi-phase motor 230a.

Meanwhile, the motor neutral point na of the multi-phase motor 230a may represent a node in which individual phases are bound to a single point.

Meanwhile, the motor neutral point na of the multi-phase motor 230a may represent a node whose current becomes 0 according to a phase difference in a multi-phase AC system.

For example, since the single-phase motor 230b is rotated due to a-phase current when connecting to the a-phase of the multi-phase motor 230a, it operates dependently. Accordingly, it may be difficult to drive at a different speed from the multi-phase motor 230a.

As another example, since the single-phase motor 230b is rotated due to b-phase current when connecting to the b-phase of the multi-phase motor 230a, it operates dependently. Accordingly, it may be difficult to drive at a different speed from the multi-phase motor 230a.

As another example, since the single-phase motor 230b is rotated due to c-phase current when connecting to the c-phase of the multi-phase motor 230a, it operates dependently. Accordingly, it may be difficult to drive at a different speed from the multi-phase motor 230a.

Accordingly, in the present disclosure, the multi-phase motor 230a is connected to one end ni of the single-phase motor 230b, by using the motor neutral point na of the multi-phase motor 230a where the current is zero according to the phase difference in the multi-phase AC system. Accordingly, the single-phase motor 230b can be driven independently of the multi-phase motor 230a.

In addition, in order to prevent the voltage imbalance in the DC terminal, the DC terminal neutral point n, which is a node between the first capacitor C1 and the second capacitor C2, is electrically connected to the other end no of the single-phase motor 230b. Accordingly, it is possible to reduce the voltage imbalance between the first capacitor C1 and the second capacitor C2.

Thus, a plurality of motors are serially connected with each other, it is possible to stably and independently drive a plurality of motors while reducing voltage imbalance between the first capacitor C1 and the second capacitor C2, and preventing the reduction of voltage utilization of the inverter 420.

Meanwhile, in the device for driving a plurality of motors 220 according to an embodiment of the present disclosure, the number of capacitors is increased due to the first capacitor C1 and the second capacitor C2, but a plurality of motors can be driven by using a single inverter. Therefore, due to the reduction in the number of expensive inverters, the manufacturing cost is significantly reduced.

Figure 6:
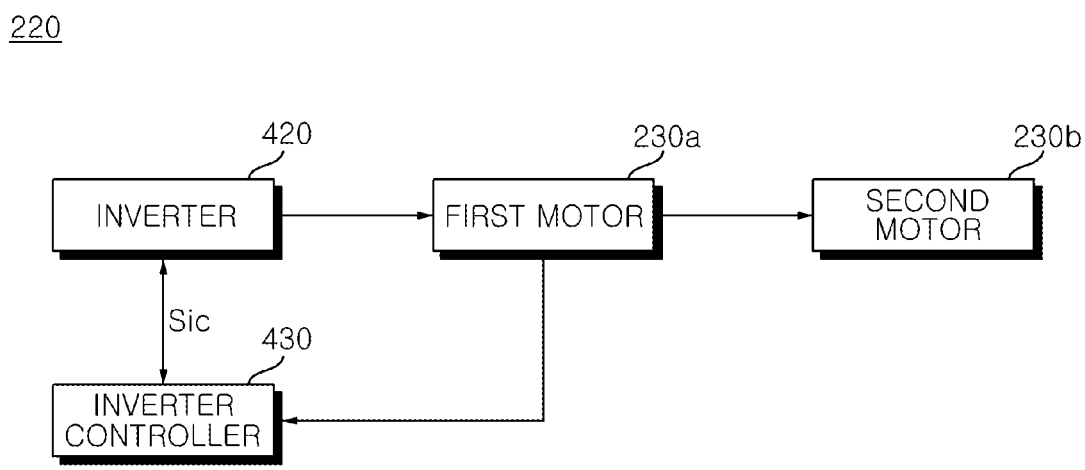
FIG. 6 illustrates an example of an internal block diagram of the device for driving a plurality of motors of FIG. 5.
Figure 7:
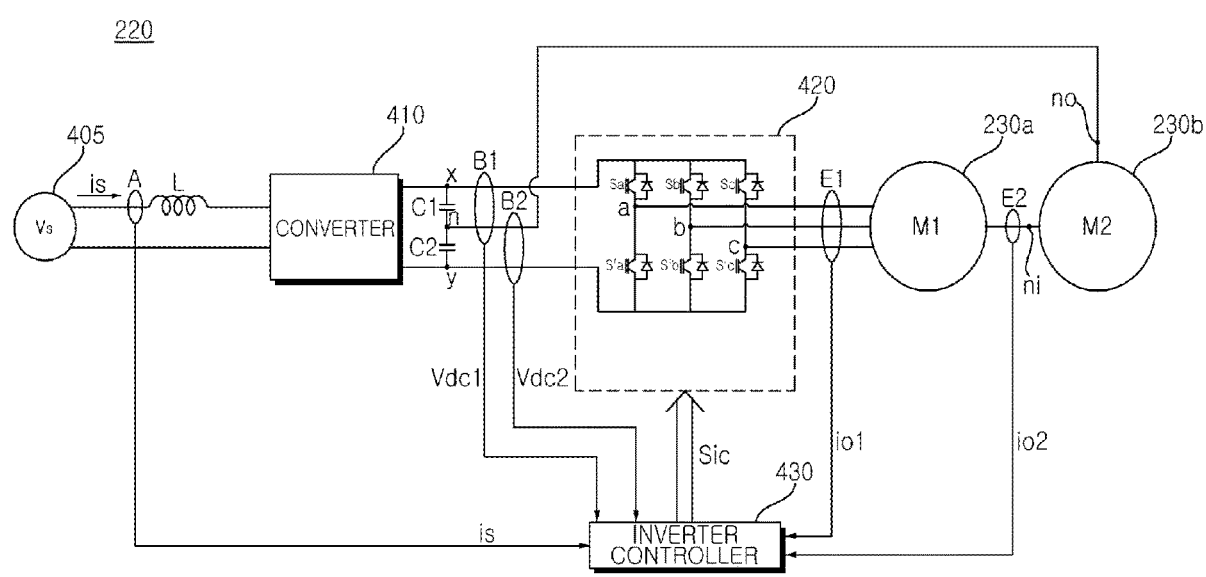
FIG. 7 is a detailed internal circuit diagram of the device for driving a plurality of motors of FIG. 5.

FIG. 6 illustrates an example of an internal block diagram of the device for driving a plurality of motors of FIG. 5, and FIG. 7 is a detailed internal circuit diagram of the device for driving a plurality of motors of FIG. 5.

Referring to the drawing, the device for driving a plurality of motors 220 according to an embodiment of the present disclosure is implemented to drive a plurality of motors, and may include an inverter connected to the DC terminal 420, a multi-phase motor 230a connected to the inverter 420, a single-phase motor 230b serially connected to the multi-phase motor 230a, and an inverter controller 430 for controlling the inverter 420.

The multi-phase motor 230a may be a three-phase motor, but is not limited thereto, and may be a four-phase motor or more.

Meanwhile, in order to prevent a decrease in voltage utilization of the inverter when driving a plurality of motors using a single inverter 420, the present disclosure suggests a method of connecting a plurality of motors in series rather than connecting in parallel.

In addition, the inverter controller 430 controls such that the current output from one inverter 420 includes at least one frequency so as to accomplish a simultaneous or single driving of the multi-phase motor 230a and the single-phase motor 230b serially connected.

In particular, in order to drive the multi-phase motor 230a and the single-phase motor 230b simultaneously at different speeds, the inverter controller 430 control such that a plurality of frequencies superpose to the current output from one inverter 420, and control such that one frequency is included in the current output from one inverter 420 so as to drive the multi-phase motor 230a and the single phase motor 230b simultaneously at the same speed.

For example, when driving the single-phase motor 230b and the multi-phase motor 230a in the device for driving a plurality of motors 220 at the same speed, it is preferable that the number of frequencies of the current input to the multi-phase motor 230a is smaller than the number of frequencies of current input to the multi-phase motor 230a when driving the single-phase motor 230b and the multi-phase motor 230a at different speeds.

Specifically, the inverter controller 430 according to an embodiment of the present disclosure may control such that when driving the single-phase motor 230b and the multi-phase motor 230a at the same speed, the frequency of the current input to the multi-phase motor 230a is one, and when driving the single-phase motor 230b and the multi-phase motor 230a at different speeds, the frequencies of the current input to the multi-phase motor 230a are two or more.

Accordingly, a plurality of motors serially connected with each other can be driven at different speeds by using a single inverter 420. In addition, it is also possible to drive a plurality of motors serially connected with each other at the same speed by using a single inverter 420. Consequentially, a plurality of motors can be stably driven by using a single inverter 420 while preventing a reduction in the voltage utilization of the inverter 420.

Meanwhile, in order to accomplish sensorless control, the device for driving a plurality of motors 220 may not include a hall sensor, etc., but may include a first current detector E1 for detecting a first current (io1) input to the multi-phase motor 230a, and a second current detector E2 for detecting a second current (io2) input to the single-phase motor 230b.

The first current (io1) and the second current (io2) detected by the first current detector E1 and the second current detector E2, respectively, are input to the inverter controller 430 so as to accomplish sensorless control.

The inverter controller 430 may output a switching control signal Sic for driving the multi-phase motor 230a and the single phase motor 230b, based on the first current (io1) and the second current (io2) respectively detected by the first current detector E1 and the second current detector E2.

Meanwhile, the inverter controller 430 may calculate the potential of the motor neutral point (na), based on the first current io1 detected by the first current detector E1 or the second current io2 detected by the second current detector E2.

Meanwhile, the device for driving a plurality of motors 220 according to an embodiment of the present disclosure may further include a first voltage detector B1 for detecting a DC voltage of both ends of the first capacitor C1, a second voltage detector B2 for detecting a DC voltage of both ends of the second capacitor C2, and a controller 430 for controlling the inverter 420.

Meanwhile, the inverter controller 430 may calculate the potential of the DC terminal neutral point n, based on a first DC voltage Vdc1 detected by the first voltage detector B1 and a second DC voltage Vdc2 detected by the second voltage detector B2. Accordingly, the inverter controller 430 can make the potential between the motor neutral point na and the DC terminal neutral point n to be the same or different.

Meanwhile, unlike FIG. 7, without the voltage detector B1, B2 for measuring the voltage of the first capacitor C1 and the second capacitor C2, the inverter controller 430 can estimate the voltage of the first capacitor C1 and the voltage of the second capacitor C2, as well as the voltage of both ends of the DC terminal.

Meanwhile, the device for driving a plurality of motors 220 according to an embodiment of the present disclosure may further include a converter 410 for outputting a converted DC power to a DC terminal (x-y terminal), an input current detector A, a reactor L, etc.

FIG. 7 illustrates that the power input to the converter 410 is an AC power, but it is not limited thereto, and it is also possible that DC power is applied and the converter 410 performs a DC power level conversion so that the converted DC power can be output.

The reactor L is disposed between a commercial AC power source 405 (vs) and the converter 410 to perform power factor correction or voltage boost. The reactor L may also serve to restrict a harmonic current according to high-speed switching of the converter 410.

The input current detector A may detect input current is that is input from the commercial AC power source 405. To this end, a current transformer (CT) or a shunt resistor may be used as the input current detector A. The detected input current is, which is a discrete signal in the form of a pulse, may be input to the inverter controller 430.

The converter 410 converts the commercial AC power 405 applied via the reactor L into DC power and output the DC power. While the commercial AC power 405 is illustrated as a single-phase AC power, three-phase AC power may be employed as the commercial AC power 405. The internal structure of the converter 410 depends on the type of the commercial AC power source 405.

The converter 410 may be configured by diodes without the switching element. In this case, the converter 410 may perform the rectification operation without performing a separate switching operation.

For example, when the applied power is single-phase AC power, four diodes may be used in the form of a bridge. When the applied power is three-phase AC power, six diodes may be used in the form of a bridge.

As the converter 410, a half-bridge converter formed by connecting, for example, two switching elements and four diodes may be used. When three-phase AC power is employed, six switching elements and six diodes may be used. In this case, the converter 410 may be referred to as a rectifier.

When the converter 410 is provided with switching elements, the converter 410 may perform voltage boost, power factor improvement and DC power conversion according to the switching operation of the switching elements.

The first capacitor C1 and the second capacitor C2, which are DC terminal capacitors, smooth and store the power input from the converter 410.

Meanwhile, since both ends of the DC terminal (x-y terminal) stores the DC power, they may be referred to as a dc link terminal.

The first voltage detector B1 and the second voltage detector B2 respectively detect the DC voltage Vdc1 of both ends of the first capacitor C1 and the DC voltage Vdc2 of both ends of the second capacitor C2.

To this end, the first voltage detector B1 and the second voltage detector B2 may include a resistance element, an amplifier, and the like. The detected first DC voltage Vdc1 and the second DC voltage Vdc2 may be input to the inverter controller 430 as a discrete signal in the form of a pulse.

The inverter 420 includes a plurality of inverter switching elements, and converts the DC power Vdc that is a voltage of both ends of the DC terminal (x-y terminal) by the turn-on/off operation of the switching element to output the converted AC power to the multi-phase motor 230a of a certain frequency.

For example, when the multi-phase motor 230a is a three-phase motor, the inverter 420 may convert into three-phase AC power (va, vb, vc) and output to the three-phase synchronous motor 230a.

Hereinafter, for convenience of description, it is assumed that the multi-phase motor 230a is a three-phase motor.

The inverter 420 includes upper switching elements Sa, Sb and Sc and lower switching elements S'a, S'b and S'c. Each of the upper switching elements Sa, Sb, Sc and a corresponding lower switching element S'a, S'b, S'c are serially connected to form a pair. Three pairs of upper and lower switching elements Sa and S'a, Sb and S'b, and Sc and S'c are connected in parallel. Each of the switching elements Sa, S'a, Sb, S'b, Sc and S'c is connected with a diode in an antiparallel manner.

The switching elements in the inverter 420 perform turn-on/off operation of each switching element based on the inverter switching control signal Sic from the inverter controller 430. Thereby, three-phase AC power having various frequencies is output to the three-phase synchronous motor 230a.

The inverter controller 430 may control the switching operation of the inverter 420 based on the sensorless method.

To this end, the inverter controller 430 may receive the first current io1 flowing through the multi-phase motor 230a from the first current detector E1, and receive the second current io2 input to the single-phase motor 230b from the second current detector E2.

The inverter controller 430 outputs a corresponding inverter switching control signal Sic to the inverter 420 in order to control the switching operation of the inverter 420, in particular, to drive the multi-phase motor 230a and the single-phase motor 230b at the same speed, to drive the multi-phase motor 230a and the single-phase motor 230b at different speeds, to drive only the multi-phase motor 230a, or to drive only the single-phase motor 230b.

The inverter switching control signal Sic is a switching control signal of a pulse width modulation (PWM) method, and is generated and output based on the first current io1 and the second current io2. Detailed operation of the output of the inverter switching control signal Sic in the inverter controller 430 will be described later with reference to FIG. 3.

The first current detector E1 may detect the first current io1 flowing between the inverter 420 and the multi-phase motor 230a.

The second current detector E2 may detect the second current io2 flowing between the multi-phase motor 230a and the single-phase motor 230b.

Meanwhile, the first current io1 and the second current io2 detected by the first current detector E1 and the second current detector E2 may be a phase current ia, ib, ic, or id.

The detected first current io1 and the second current io2 may be applied to the inverter controller 430 as a discrete signal in the form of a pulse, and an inverter switching control signal Sic is generated based on the detected first current io1 and second current io2.

Meanwhile, the multi-phase motor 230a includes a stator and a rotor, and each phase AC power of a certain frequency is applied to a coil of the stator of each phase (a, b, c phase), so that the rotor rotates.

Such a multi-phase motor 230a may include, for example, a Surface-Mounted Permanent-Magnet Synchronous Motor (SMPMSM), an Interior Permanent Magnet Synchronous Motor (IPMSM), a Synchronous Reluctance Motor (Synrm), and the like. Among them, SMPMSM and IPMSM are a Permanent Magnet Synchronous Motor (PMSM) to which permanent magnet is applied, and Synrm has no permanent magnet.

The single-phase motor 230b includes a stator and a rotor, and each phase AC power of a certain frequency is applied to the coil of the stator of one phase, so that the rotor rotates.

Meanwhile, the inverter controller 430 may control torque, speed, and position of each motor in order to control the multi-phase motor 230a and the single-phase motor 230b.

Meanwhile, the inverter controller 430 may control torque, speed, and position of each motor not only for driving the multi-phase motor 230a and the single-phase motor 230b but also for maintaining the non-drive state.

Meanwhile, the stopping of the multi-phase motor 230a or the single-phase motor 230b may be implemented through zero torque control, zero speed control, and fixed position control.

Meanwhile, the torque control of the three-phase motor and the single-phase motor is based on current control, and in general, a voltage applied to the motor is implemented in a PWM method for current control.

Meanwhile, the inverter controller 430 may include vector control (FOC control), torque control (DTC), MTPA, weak magnetic flux, and the like for current control.

Figure 8:
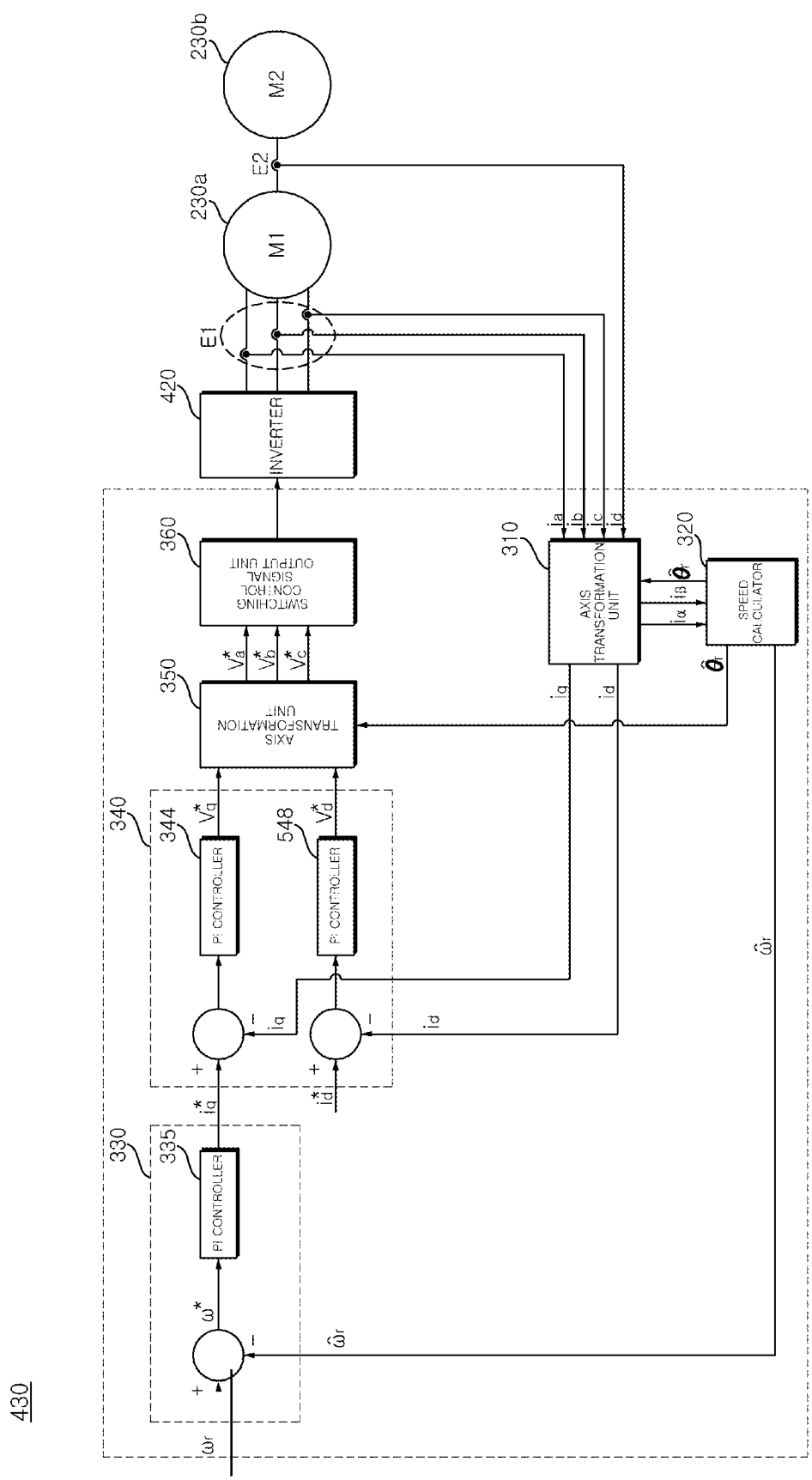
FIG. 8 is an internal block diagram of an inverter controller of FIG. 7.

FIG. 8 is an internal block diagram of an inverter controller of FIG. 7.

Referring to the drawing, the inverter controller 430 may include an axis transformation unit 310, a speed calculator 320, a current command generator 330, a voltage command generator 340, an axis transformation unit 350, and a switching control signal output unit 360.

The axis transformation unit 310 may convert the output current (ia, ib, ic) and the output current (id) detected by the first output current detector E1 and the second output current detector E2 into two phase current (iα, iβ) of a stationary coordinate system.

Meanwhile, the axis transformation unit 310 may convert the two-phase current (iα, iβ) of the stationary coordinate system into two-phase current (id, iq) of the rotating coordinate system.

The speed calculator 320 may estimate the position value ($\hat{\theta}_r$) and differentiate the estimated position to calculate the speed ($\hat{\omega}_r$), based on the output current (ia, ib, ic) and the output current (id) detected by the first output current detector E1 and the second output current detector E2.

The current command generator 330 generates a current command value i*q based on the calculated speed $\hat{\omega}_r$ and a speed command value ω*r. For example, the current command generator 330 may perform PI control in a PI controller 335 and generate the current command value i*q based on the difference between the calculated speed $\hat{\omega}_r$ and the speed command value ω*r. While FIG. 8 illustrates a q-axis current command value i*q as a current command value, a d-axis current command value i*d may also be generated. The d-axis current command value i*d may be set to 0.

The current command generator 330 may further include a limiter (not shown) for limiting the level of the current command value i*q such that the current command value i*q does not exceed an allowable range.

Next, the voltage command generator 340 generates d-axis and q-axis voltage command values v*d and v*q based on the d-axis and q-axis currents id and iq which are transformed into currents in the two-phase rotating axis by the axis transformation unit and the current command values i*d and i*q from the current command generator 330. For example, the voltage command generator 340 may perform PI control in a PI controller 344 and generate a q-axis voltage command value v*q based on the difference between the q-axis current iq and the q-axis current command value i*q. In addition, the voltage command generator 340 may perform PI control in a PI controller 348 and generate the d-axis voltage command value v*d based on the difference between the d-axis current id and the d-axis current command value i*d. The voltage command generator 340 may further include a limiter (not shown) for limiting the levels of the d-axis and q-axis voltage command values v*d and v*q such that the d-axis and q-axis voltage command values v*d and v*q do not exceed an allowable range.

The generated d-axis and q-axis voltage command values v*d and v*q are input to the axis transformation unit 350.

The axis transformation unit 350 receives the position $\hat{\theta}_r$ calculated by the speed calculator 320 and the d-axis and q-axis voltage command values v*d and v*q and performs axis transformation.

The axis transformation unit 350 transforms a two-phase rotating axis into a two-phase stationary axis. The transformation may be performed using the position $\hat{\theta}_r$ calculated by the speed calculator 320.

The axis transformation unit 350 may also transform the two-phase stationary axis into a three-phase stationary axis. Through such transformation, the axis transformation unit 350 outputs three-phase output voltage command values v*a, v*b, and v*c.

The switching control signal output unit 360 outputs a PWM inverter switching control signal Sic based on the three-phase output voltage command values v*a, v*b, and v*c.

The output inverter switching control signal Sic is transformed into a gate drive signal in a gate driver (not shown) and then input to the gate of each switching element in the inverter 420. Thereby, the switching elements Sa, S'a, Sb, S'b, Sc, and S'c in the inverter 420 perform the switching operation.

Meanwhile, the switching control signal output unit 360 may control the switching element in the inverter 420 by variable pulse width control based on a space vector.

Meanwhile, the switching control signal output unit 360 may output a corresponding switching control signal Sic such that the number of frequencies of the current input to the multi-phase motor 230a when the single-phase motor 230b and the multi-phase motor 230a are driven at the same speed is smaller than the number of frequencies of the current input to the multi-phase motor 230a when the single-phase motor 230b and the multi-phase motor 230a are driven at different speeds.

Accordingly, a plurality of motors serially connected with each other may be driven at different speeds by using a single inverter 420. In addition, it is also possible to drive a plurality of motors serially connected with each other at the same speed by using a single inverter 420. Thus, a plurality of motors may be stably driven by using a single inverter 420 while preventing a reduction in the voltage utilization of the inverter 420.

Meanwhile, the switching control signal output unit 360 may output a corresponding switching control signal Sic such that the number of frequency of the current input to the multi-phase motor 230a is one when the single-phase motor 230b and the multi-phase motor 230a are driven at the same speed, and the number of frequencies of the current input to the multi-phase motor 230a is two or more when the single-phase motor 230b and the multi-phase motor 230a are driven at different speeds.

Accordingly, a plurality of motors serially connected with each other may be driven at different speeds using a single inverter 420. In addition, it is also possible to drive a plurality of motors serially connected with each other at the same speed using a single inverter 420.

Meanwhile, the switching control signal output unit 360 may output a corresponding switching control signal Sic such that a current corresponding to a single sine wave flows through the inverter 420 when the single-phase motor 230b and the multi-phase motor 230a are driven at the same speed, and a current corresponding to the sum of a plurality of sine waves flows through the inverter 420 when the single-phase motor 230b and the multi-phase motor 230a are driven at different speeds.

Meanwhile, Meanwhile, the switching control signal output unit 360 may output a corresponding switching control signal Sic such that when the single-phase motor 230b and the multi-phase motor 230a are driven at different speeds, the multi-phase motor 230a rotates at a first speed corresponding to a first frequency of a first current input to the multi-phase motor 230a, and the single-phase motor 230b rotates at a second speed corresponding to a second frequency of the current flowing through the multi-phase motor 230a.

Accordingly, a plurality of motors serially connected with each other can be stably driven at different speeds using a single inverter 420.

Meanwhile, the switching control signal output unit 360 may output a corresponding switching control signal Sic such that the multi-phase motor 230a and the single-phase motor 230b are driven by an effective current of the same frequency when the single-phase motor 230b and the multi-phase motor 230a are driven at the same speed.

Accordingly, it is possible to stably drive a plurality of motors serially connected with each other at the same speed using a single inverter 420.

Meanwhile, the switching control signal output unit 360 may output a corresponding switching control signal Sic such that the operation period of the single-phase motor 230b is shorter than the operation period of the multi-phase motor 230a. Accordingly, a plurality of motors serially connected with each other can be stably driven using a single inverter 420.

Meanwhile, the switching control signal output unit 360 may output a corresponding switching control signal Sic such that when the single-phase motor 230b and the multi-phase motor 230a are driven simultaneously, current flows through the multi-phase motor 230a and the single-phase motor 230b, and when only the multi-phase motor 230a is driven, current does not flow through the single-phase motor 230b.

Accordingly, a plurality of motors serially connected with each other can be stably driven at different speeds by using a single inverter 420. In addition, by using a single inverter 420, it is possible to stably drive only the multi-phase motor 230a among a plurality of motors serially connected with each other.

Meanwhile, when only the single-phase motor 230b is driven, the switching control signal output unit 360 outputs a corresponding switching control signal Sic such that all of the upper and lower switching elements of the inverter 420 are turned on. Accordingly, by using a single inverter 420, it is possible to stably drive only the multi-phase motor 230a among a plurality of motors serially connected with each other.

Meanwhile, the switching control signal output unit 360 may output a corresponding switching control signal Sic such that when the single-phase motor 230b and the multi-phase motor 230a are driven simultaneously, the electric potential between a motor neutral point na of the multi-phase motor 230a and a DC terminal neutral point n between the first capacitor C1 and the second capacitor C2 is different, and when only the multi-phase motor 230a is driven, the electric potential between the motor neutral point na and the DC terminal neutral point n is the same.

Accordingly, it is possible to stably drive a plurality of motors serially connected with each other at different speeds, or to stably drive only a multi-phase motor 230a among a plurality of motors serially connected with each other, by using a single inverter 420.

Meanwhile, when only the single-phase motor 230b is driven, the switching control signal output unit 360 may output a corresponding switching control signal Sic such that all of the upper switching elements or lower switching elements of the inverter 420 are turned on. Accordingly, it is possible to stably drive only the single-phase motor 230b among a plurality of motors serially connected with each other, by using a single inverter 420.

Figure 9A:
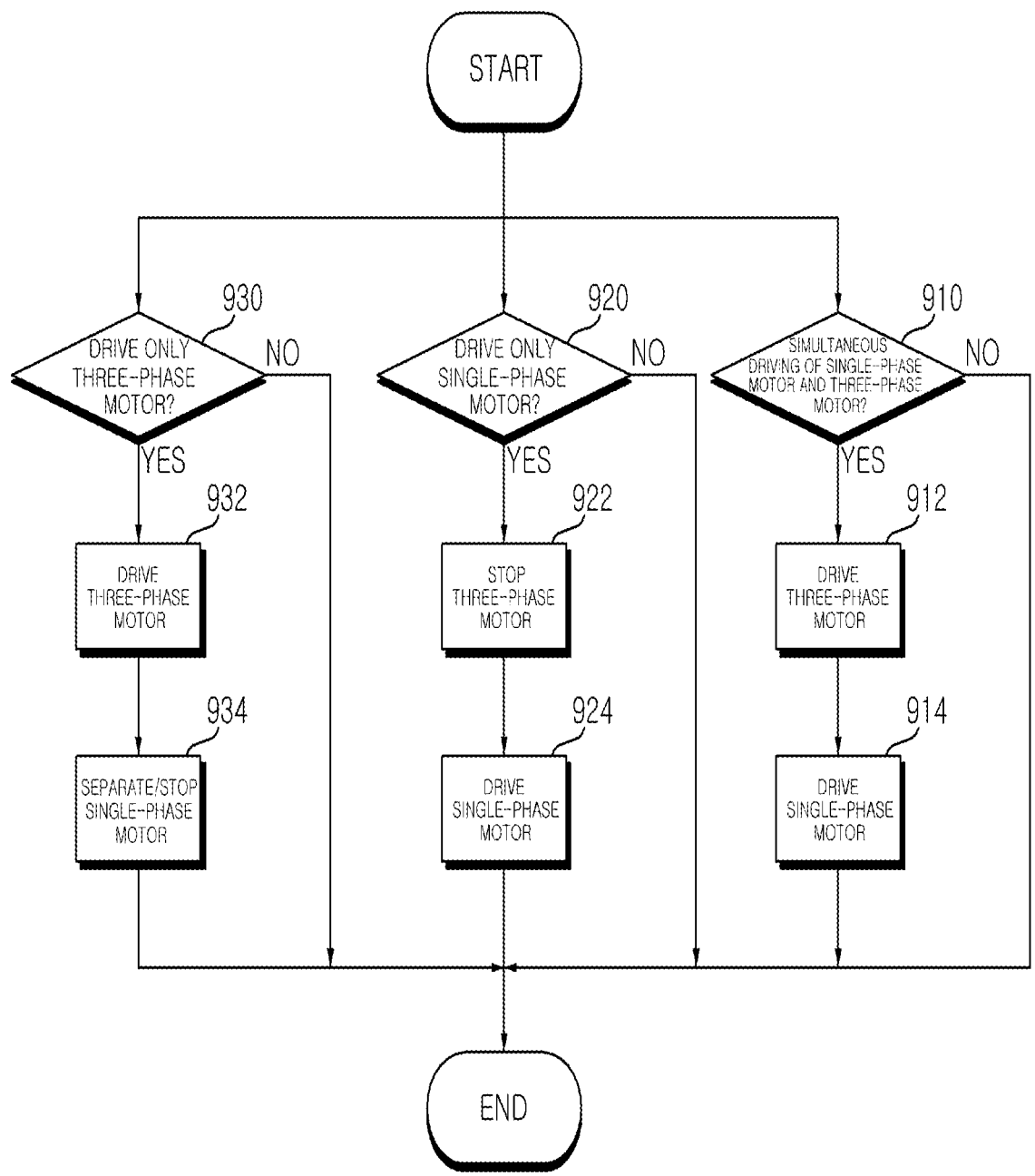
FIG. 9A is a diagram showing various operation modes of a multi-phase motor and a single-phase motor of the device for driving a plurality of motors of FIG. 5.

FIG. 9A is a diagram showing various operation modes of a multi-phase motor and a single-phase motor of the device for driving a plurality of motors of FIG. 5.

Referring to the drawing, the multi-phase motor 230a and the single-phase motor 230b may be divided into a simultaneous driving mode in which both motors are simultaneously driven, a single-phase motor single driving mode in which only a single-phase motor is driven, and a multi-phase motor single driving mode in which only a multi-phase motor is driven.

In the case of the simultaneous driving mode (S910), the inverter controller 430 drives the multi-phase motor 230a (S912), and drives the single-phase motor 230b (S914).

The current output from the inverter controller 430 is input to the single-phase motor 230b via the multi-phase motor 230a, but it can be said that steps 912 and 914 are performed almost simultaneously.

Meanwhile, the simultaneous driving mode may be divided into a same speed mode in which the single-phase motor 230b and the multi-phase motor 230a are driven at the same speed, and a different speed mode in which the single-phase motor 230b and the multi-phase motor 230a are driven at different speeds.

Figure 9B:
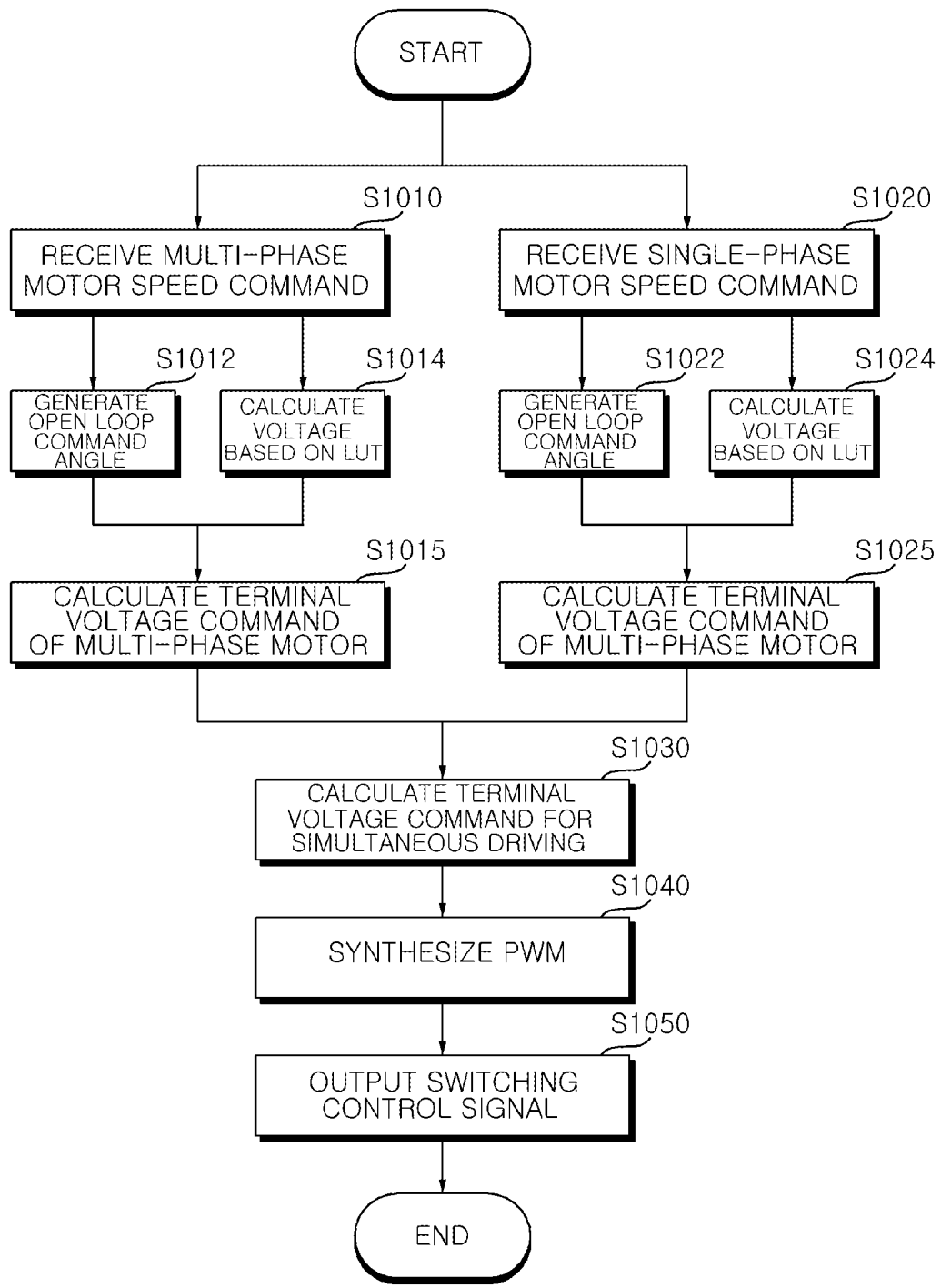
FIG. 9B is a flowchart illustrating an internal operation of an inverter controller according to various operation modes.

FIG. 9B is a flowchart illustrating the internal operation of the inverter controller according to various operation modes. More specifically, it may be a flowchart corresponding to the different speed mode of the simultaneous driving mode.

Referring to the drawing, the inverter controller 430 may receive a multi-phase motor speed command from an external controller or a communicator (S1010), and receive a single-phase motor speed command (S1020).

Next, the inverter controller 430 may generate an open loop command angle based on the multi-phase motor speed command (S1012), and calculate a voltage based on lookup table (S1014).

For example, when the open loop command angle of the multi-phase motor is generated, the voltage based on lookup table corresponding to the open loop command angle in a lookup table may be calculated.

In addition, the inverter controller 430 may calculate a current command value and a terminal voltage command of the multi-phase motor, based on the calculated open loop command angle and the voltage based on lookup table (S1015).

Meanwhile, the inverter controller 430 may generate an open loop command angle based on a single-phase motor speed command (S1022), and calculate a voltage based on lookup table (S1024).

For example, when the open loop command angle of the single-phase motor is generated, a voltage based on lookup table corresponding to the open loop command angle in the look-up table may be calculated.

In addition, the inverter controller 430 may calculate the current command value and the terminal voltage command of the single-phase motor, based on the calculated open loop command angle and the voltage based on lookup table (S1025).

Next, the inverter controller 430 may calculate the terminal voltage command for simultaneous driving of the single-phase motor 230b and the multi-phase motor 230a, by using the calculated multi-phase motor terminal voltage command and single-phase motor terminal voltage command (S1030).

Next, the inverter controller 430 may synthesize a signal for pulse width variable modulation based on the calculated terminal voltage command for simultaneous driving (S1040), and output a PWM-based switching control signal (S1050).

Figure 10:
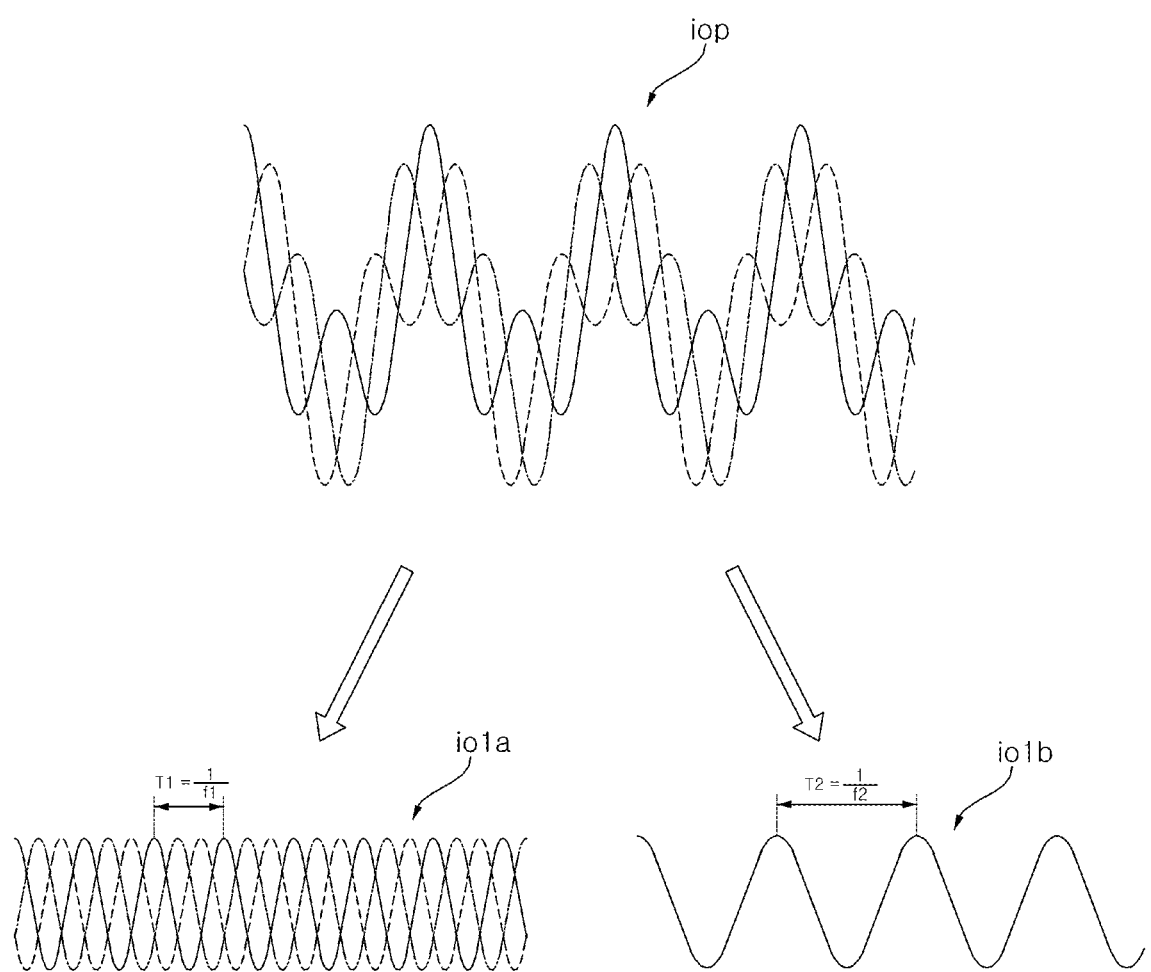
FIG. 10 illustrates an output current waveform output from an inverter of a device for driving a plurality of motors according to an embodiment of the present disclosure.

FIG. 10 illustrates an output current waveform iop output from an inverter of a device for driving a plurality of motors according to an embodiment of the present disclosure.

In particular, FIG. 10 illustrates the output current waveform iop output from the inverter 420 to drive the multi-phase motor 230a and the single-phase motor 230b simultaneously at different speeds.

The output current waveform iop output from the inverter 420 may include a first current waveform io1a for driving the multi-phase motor 230a, and a second current waveform io1ab for driving the single-phase motor 230b.

Meanwhile, the output current waveform iop output from the inverter 420 flows through the multi-phase motor 230a intactly, and the first current waveform io1a component of the output current waveform iop, as an effective current, is used for driving the multi-phase motor 230a.

Next, the second current waveform io1ab excluding the first current waveform io1a component of the output current waveform iop output from the inverter 420 is input and flows in the single-phase motor 230*b* serially connected to the multi-phase motor 230*a*.

That is, the second current waveform io1*b*, as an effective current, is used for driving the single-phase motor 230*b*.

Meanwhile, FIG. 10 illustrates that a period T1 of the first current waveform io1*a* is smaller than a period T2 of the second current waveform io1*ab*.

That is, FIG. 10 illustrates that the frequency f1 of the first current waveform io1*a* is greater than the frequency f2 of the second current waveform io1*b*. Accordingly, the driving speed of the multi-phase motor 230*a* may be greater than the driving speed of the single-phase motor 230*b*.

FIG. 11A to FIG. 11F are diagrams showing the same speed mode of the simultaneous driving modes.

Figure 11A:
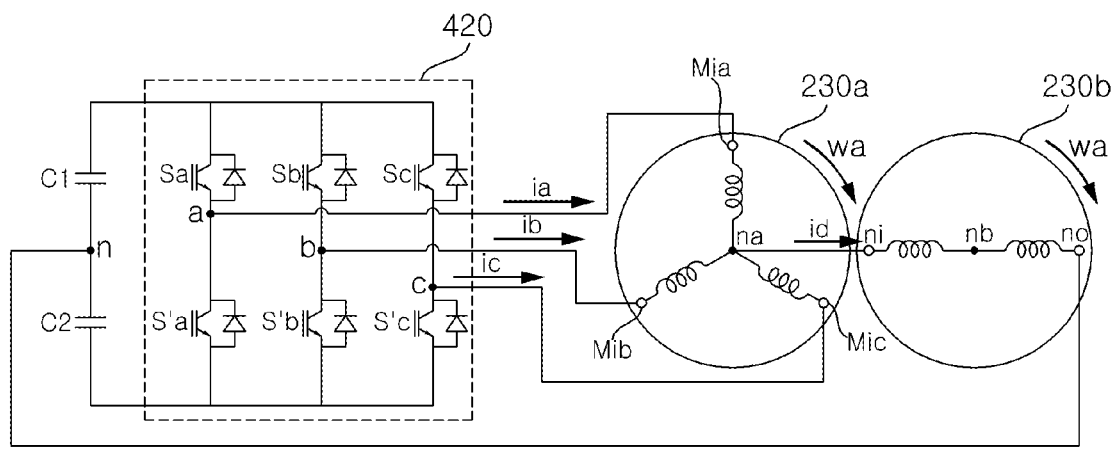
FIGS. 11A to 11F are diagrams referenced to explain a same speed mode among a mode of simultaneous driving of a multi-phase motor and a single-phase motor.
Figure 11B:
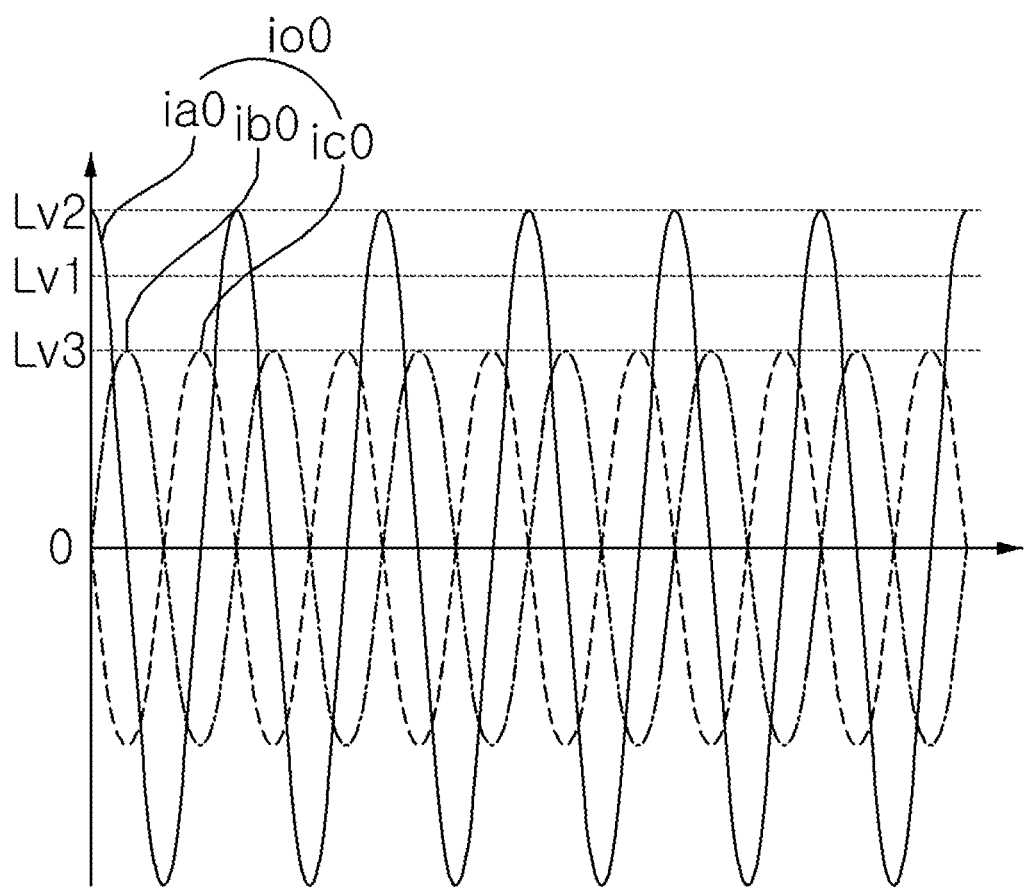

As shown in FIG. 11A, according to partly turn-on, partly turn-off of the six switching elements of the inverter 420, the output current waveform io0 output from the inverter 420 may contain, as shown in FIG. 11B, a-phase output current waveform ia0, b-phase output current waveform ib0, and c-phase output current waveform ic0.

Particularly, a part of the upper switching elements Sa, Sb, and Sc of the inverter 420 may be turned on, and remaining part may be turned off, or a part of the lower switching elements S'a, S'b, and S'c of the inverter 420 may be turned on, and remaining part may be turned off. Accordingly, the output current waveform io0 output from the inverter 420, as shown in FIG. 11B, may contain a-phase output current waveform ia0, b-phase output current waveform ib0, and c-phase output current waveform ic0.

FIG. 11B illustrates that the maximum level of the a-phase output current waveform ia0 is Lv2, and the maximum level of the b-phase output current waveform ib0 and the c-phase output current waveform ic0 is Lv3.

Meanwhile, the output current waveform io0 output from the inverter 420 of FIG. 11B may be summarized as in Equation 1 below.

$$io0(t) = L_{V2} \sin(wat) + L_{V1} \sin(wa(t-120°)) + L_{V3} \sin(wa(t-240°))$$ [Equation 1]

Here, Lv2×sin(wat) represents the a-phase output current waveform ia0, Lv1×sin (wa(t−120°) represents the b-phase output current waveform ib0, and Lv3×sin (wa(t)−240°) represents the c-phase output current waveform ic0.

Meanwhile, Lv2 in FIG. 11B may be 4/3 times (approximately 1.3 times) Lv1, and Lv3 in FIG. 11B may be √3/2 times (approximately 0.87 times) Lv1.

According to Equation 1, the output current waveform io0 output from the inverter 420 contains a-phase output current waveform ia0, b-phase output current waveform ib0, and c-phase output current waveform ic0, and the level of each phase current waveform is different as Lv2, Lv1, Lv3, and the phases are different as 0, 120, and 240 degrees.

According to Equation 1, the angular velocities of the a-phase output current waveform ia0, b-phase output current waveform ib0, and c-phase output current waveform ic0 in the output current waveform io0 output from the inverter 420 are constant as wa, and accordingly, the frequencies become wa/2π equally.

That is, the output current waveform io0 output from the inverter 420 of FIG. 11B has a phase output current waveform having a different phase, but since it has the same angular velocity and the same frequency, it can be said to be composed of a single sine wave.

Figure 11C:
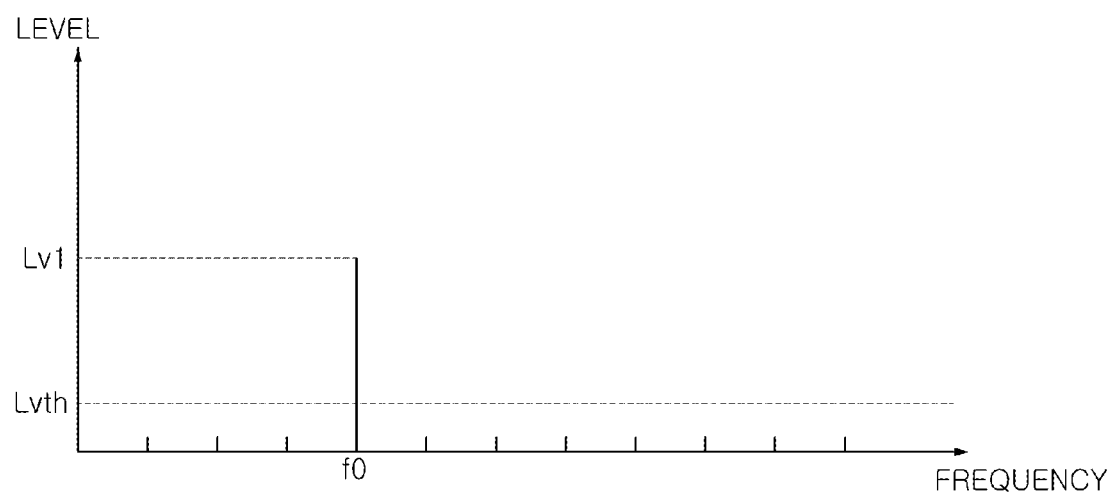

FIG. 11C is a diagram of frequency conversion of io0(*t*) in Equation 1.

Referring to the drawing, io0(*t*) in Equation 1 may have an Lv1 level at the frequency of fo due to frequency conversion.

In addition, due to the noise component, io0(*t*) in Equation 1 may have various frequency components, as shown in the drawing.

In the present disclosure, various frequency components equal to or less than Lvth, which is a lower limit of a meaningful frequency level, are ignored. Therefore, io0(*t*) in Equation 1 is defined to have a single frequency of fo due to frequency conversion.

Meanwhile, fo in FIG. 11C may represent the same value as wa/2π in relation to Equation 1.

Meanwhile, the output current waveform io0 output from the inverter 420 of FIG. 11B is input to the multi-phase motor 230*a*, and a part of the output current waveform operates as an effective current to rotate the multi-phase motor 230*a*.

Figure 11D:
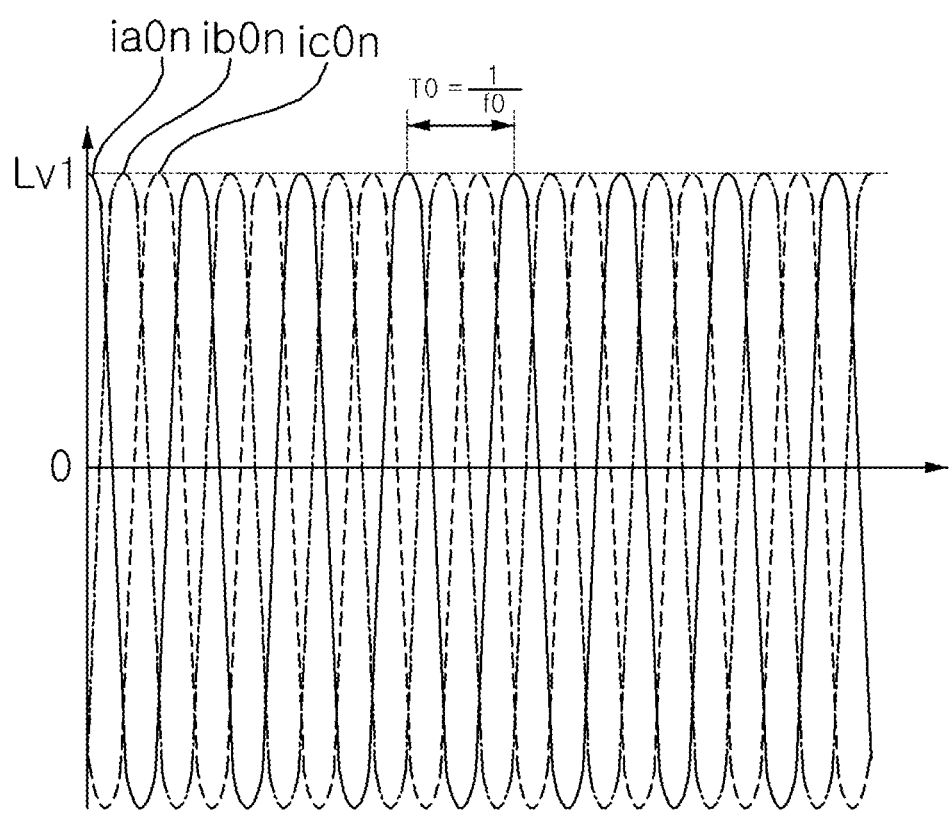

FIG. 11D illustrates the effective current flowing through the multi-phase motor 230*a*.

The effective current flowing through the multi-phase motor 230*a* may include a-phase effective current waveform ia0*n*, b-phase effective current waveform ib0*n*, and c-phase effective current waveform ic0*n*.

At this time, the maximum level of the effective current flowing through the multi-phase motor 230*a*, or the maximum level of each phase effective current waveform may be Lv1.

Meanwhile, the period of the effective current flowing through the multi-phase motor 230*a* is To, and the frequency of the effective current may be f0.

In addition, the period of the a-phase effective current waveform ia0*n*, the b-phase effective current waveform ib0*n*, and the c-phase effective current waveform ic0*n* may be To, and the frequency may be f0.

Figure 11E:
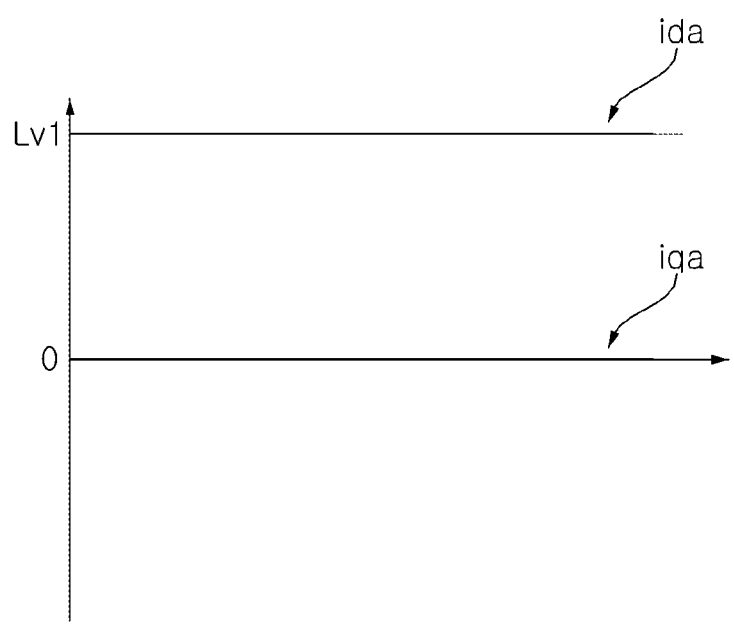

FIG. 11E illustrates the effective current flowing through the multi-phase motor 230*a* based on the synchronous coordinate system.

The a-phase current, b-phase current, and c-phase current flowing through the multi-phase motor 230*a* are converted into a d-axis current and a q-axis current based on a stationary coordinate system in the axis transformation unit 510 of FIG. 8, and then can be converted again into a d-axis current and a q-axis current based on a synchronous coordinate system or a rotating coordinate system.

Accordingly, each phase effective current based on the stationary coordinate system in FIG. 11D can be converted into a d-axis effective current ida and a q-axis effective current iqa based on the rotating coordinate system, as shown in FIG. 11E.

At this time, when the multi-phase motor 230*a* is a surface-mounted permanent magnet synchronous motor (SMPMSM), due to the symmetry of the magnetic flux, the q-axis effective current component becomes 0 as shown in the drawing, and the level of d-axis effective current ida based on the rotating coordinate system is Lv1, and may be the same as the maximum level Lv1 of the effective current flowing through the multi-phase motor 230*a*.

Figure 11F:
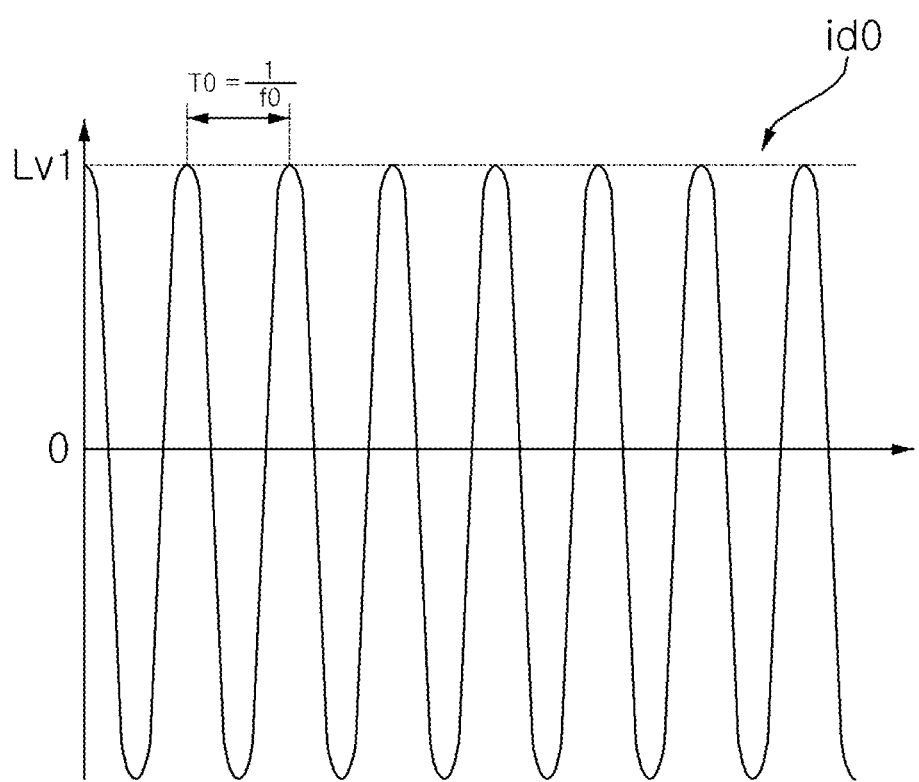

Next, FIG. 11F illustrates the current or the effective current id0 flowing through the single-phase motor 230*b*.

The maximum level of the effective current id0 flowing through the single-phase motor 230*b* is Lv1, the period is To, and the frequency is f0.

As described above, since the frequency of the effective current id0 flowing through the single-phase motor 230*b* is f0, and the frequency of the effective current flowing through the multi-phase motor 230*a* is f0, so that the frequencies of the effective current of the single-phase motor 230b and the multi-phase motor 230a are the same. Consequently, the single-phase motor 230b and the multi-phase motor 230a are driven at the same speed wa.

Meanwhile, effective currents and torques of the single-phase motor 230b and the multi-phase motor 230a may be expressed by Equation 2 below.

$$T_{ob}=3/8P\lambda_f I_m,\ T_{oa}=3/4P\lambda_f i_q \quad \text{[Equation 2]}$$

Here, Tob indicates the torque of the single-phase motor 230b, P indicates the number of poles of the motor, λf indicates the counter electromotive force constant, Im indicates the maximum level of the effective current of the single-phase motor 230b, and iq indicates the level of the q-axis current of the multi-phase motor 230a.

According to Equation 2, between the single-phase motor 230b and the multi-phase motor 230a, the number of poles P of the motor and the counter electromotive force constant λf are the same, and if Im and iq are the same, it can be known that the torque Toa of the multi-phase motor 230a is approximately two times greater than the torque Tob of the single-phase motor 230b.

That is, according to FIGS. 11A to 11F, the single-phase motor 230b and the multi-phase motor 230a rotate at the same speed, and when the multi-phase motor 230a is a three-phase motor, the torque Toa of the multi-phase motor 230a becomes approximately two times greater than the torque Tob of the single-phase motor 230b.

Meanwhile, the torques in the case where the multi-phase motor is a five-phase and a six-phase may be expressed by Equation 3 below.

$$T_{oa5}=5/4P\lambda_f I_m,\ T_{oa6}=3/2P\lambda_f i_q \quad \text{[Equation 3]}$$

Here, Toa5 indicates the torque of the five-phase motor, Toa6 indicates the torque of the six-phase motor, P indicates the number of poles of the motor, λf indicates the counter electromotive force constant, and iq indicates the level of the q-axis current of the five-phase or six-phase motor.

When Equation 2 and Equation 3 are compared, when driven at the same speed, the torque Toa5 of the five-phase motor is 10/3 times the torque Tob of the single-phase motor, and the torque Toa6 of the six-phase motor becomes 4 times the torque Tob of a single-phase motor.

Finally, according to FIGS. 11A to 11F, the multi-phase motor 230a rotates at the speed of Wa, based on the current waveform of io0 output from the inverter 420, and the single-phase motor 230b can rotate at the same speed Wa based on the current waveform of ido.

In this case, the six switching elements of the inverter 420 may perform a switching operation, except that all of the upper switching elements Sa to Sc are turned on or all of the lower switching elements S'a to S'c are turned on.

Finally, according to the device for driving a plurality of motors 220 according to an embodiment of the present disclosure, when the single-phase motor 230b and the multi-phase motor 230a are driven simultaneously at the same speed, the frequencies of the currents io0, ido respectively input to the multi-phase motor 230a and the single-phase motor 230b are preferably the same f0, as shown in FIGS. 11D and 11F.

Meanwhile, when driving the single-phase motor 230b and the multi-phase motor 230a at the same speed, the inverter controller 430 can control the multi-phase motor 230a and the single-phase motor 230b to be driven by an effective current having the same frequency f0. Accordingly, it is possible to stably drive a plurality of motors serially connected with each other at the same speed, by using a single inverter 420.

Meanwhile, the inverter controller 430 may control the magnitude of the effective current Lv1 of the multi-phase motor 230a and the magnitude of the effective current Lv1 of the single-phase motor 230b to be the same.

For example, in a state where the frequency of the effective current of the multi-phase motor 230a and the frequency of the effective current of the single-phase motor 230b are the same, when the magnitude of the effective current of the multi-phase motor 230a and the magnitude of the effective current of the single-phase motor 230b are the same, the driving torque of the multi-phase motor 230a becomes greater than the driving torque of the single-phase motor 230b.

Specifically, when the multi-phase motor 230a is a three-phase motor, the driving torque of the three-phase motor becomes approximately two times greater than the driving torque of the single-phase motor 230b.

FIGS. 12A to 12E are diagrams showing the different speed mode of the simultaneous driving mode.

Figure 12A:
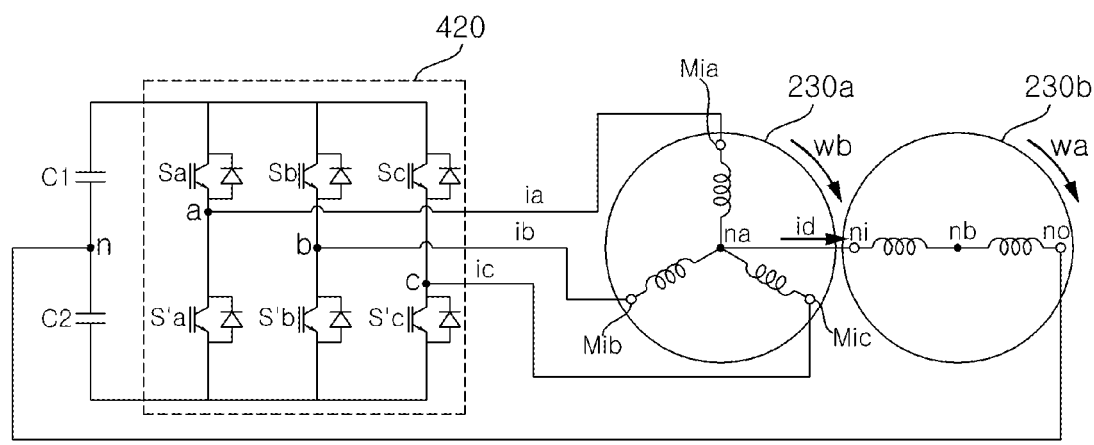
FIGS. 12A to 12E are diagrams referenced to explain a different speed mode among a mode of simultaneous driving of a multi-phase motor and a single-phase motor.
Figure 12B:
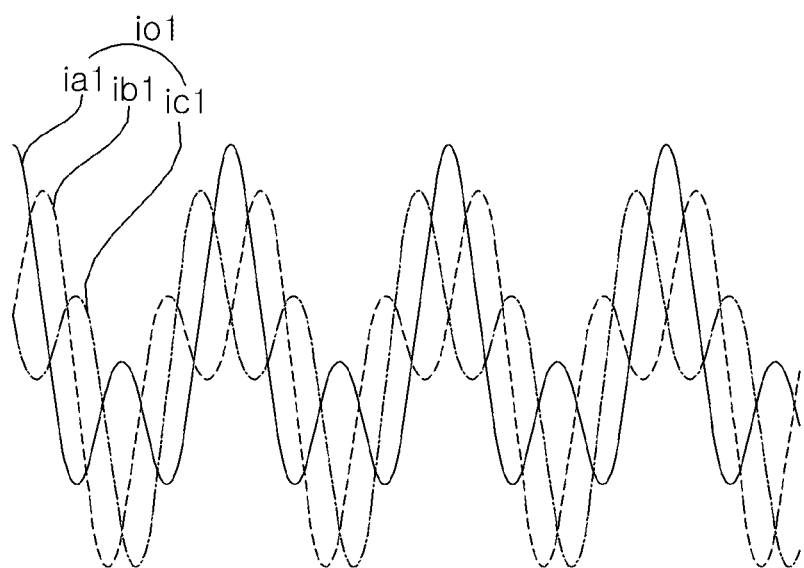

Referring to FIGS. 12A and 12B, according to partly turn-on, partly turn-off of the six switching elements of the inverter 420, the output current waveform io1 output from the inverter 420 may contain a-phase output current waveform ia1, b-phase output current waveform ib1, and c-phase output current waveform ic1.

Due to the series connection of the multi-phase motor 230a and the single-phase motor 230b, in order to simultaneously drive the multi-phase motor 230a and the single-phase motor 230b at the same speed, as illustrated in FIGS. 11A to 11F, a single frequency in the output current waveform output from the inverter 420 is sufficient.

Meanwhile, due to the series connection of the multi-phase motor 230a and the single-phase motor 230b, in order to simultaneously drive the multi-phase motor 230a and the single-phase motor 230b at different speeds, as described in FIGS. 11A to 11F, it is preferable that there are a plurality of frequencies in the output current waveform output from the inverter 420. In particular, it is preferable that there are two frequencies.

Meanwhile, the output current waveform io1 output from the inverter 420 of FIG. 12B may be summarized as in Equation 4 below.

$$io1(t)=K_{o1}\sin(wbt)+K_{b1}\sin(wb(t-120°))+K_{c1}\sin(wb(t-240°))+K_{a2}\sin(wat)+K_{b2}\sin(wa(t-120°))+K_{c2}\sin(wa(t-240°)) \quad \text{[Equation 4]}$$

Here, Ka1×sin(wbt) and Ka2×sin(wat) indicates the a-phase output current waveform ia1, Kb1×sin(wb(t−120°) and Kb2×sin(wa(t−120°)) indicates the b-phase output current waveform ib1, and Kc1×sin(wb(t−240°) and Kc2×sin(wa(t−240°) indicates the c-phase output current waveform ic1.

According to Equation 4, the output current waveform io1 output from the inverter 420 contains a-phase output current waveform ia1, b-phase output current waveform ib1, and c-phase output current waveform ic01, and the phase of each phase current waveform is different in 0 degree, 120 degrees, and 240 degrees.

According to Equation 4, the angular velocities of the a-phase output current waveform ia1, the b-phase output current waveform ib1, and the c-phase output current waveform ic1 in the output current waveform io1 output from the inverter 420 are wb and wa respectively, and accordingly, the frequencies become wb/2π and wa/2π, respectively.

That is, the output current waveform io1 output from the inverter 420 of FIG. 12B has a phase output current waveform having a different phase, but since it has two different angular speeds and two different frequencies, it can be said to be composed of multiple sine waves.

Consequently, in order to simultaneously drive the multi-phase motor 230*a* and the single-phase motor 230*b* at different speeds, it is preferable that the output current waveform io1 output from the inverter 420 corresponds to the sum of a plurality of sine waves.

Figure 12C:
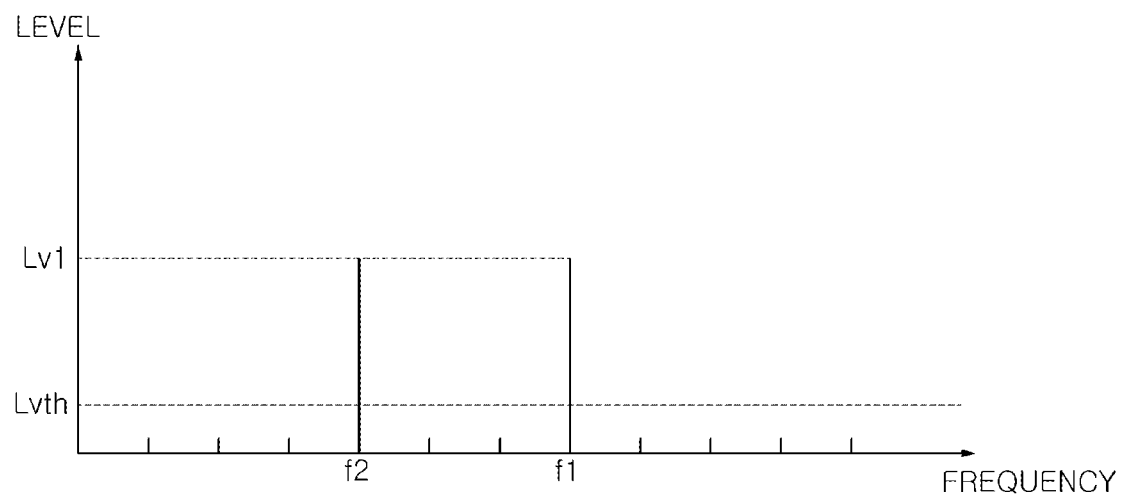

FIG. 12C is a diagram of frequency conversion of io1(*t*) in Equation 4.

Referring to the drawing, io1(*t*) in Equation 4 may have an Lv1 level at a frequency f1 and a frequency f2 due to frequency conversion.

In addition, due to the noise component, io1(*t*) in Equation 4 may have various frequency components, as shown in the drawing.

In the present disclosure, various frequency components equal to or less than Lvth, which is a lower limit of a meaningful frequency level, are ignored. Therefore, io1(*t*) in Equation 4 is defined as having two frequencies f1 and f2, due to frequency conversion.

Meanwhile, f1 in FIG. 12C indicates the same value as wb/2π in the relationship with Equation 4, and f2 may indicate the same value as wa/2π in the relationship with Equation 4.

Meanwhile, the output current waveform io1 output from the inverter 420 of FIG. 12B is input to the multi-phase motor 230*a*, and a part of the output current waveform io1 operates as an effective current to rotate the multi-phase motor 230*a*.

Figure 12D:
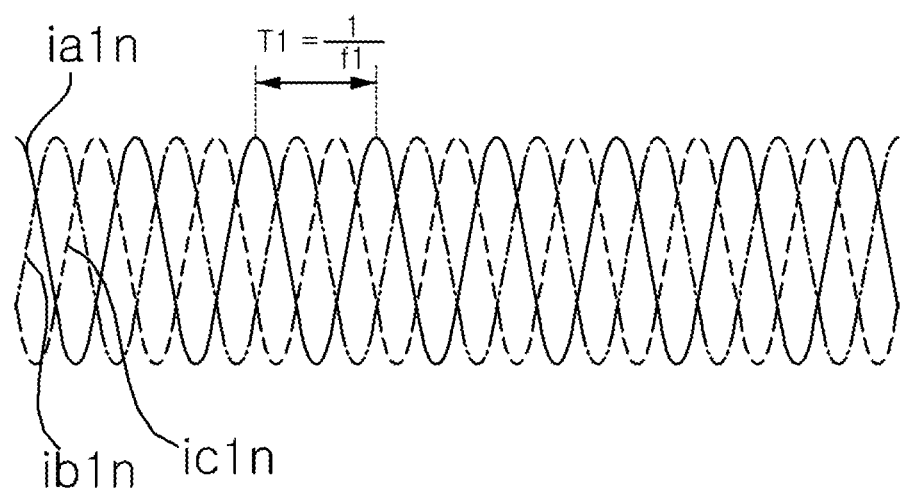

FIG. 12D illustrates the effective current flowing through the multi-phase motor 230*a*.

The effective current flowing through the multi-phase motor 230*a* may include an a-phase effective current waveform (ia1*n*), a b-phase effective current waveform (ib1*n*), and a c-phase effective current waveform (ic1*n*).

Meanwhile, the period of the effective current flowing through the multi-phase motor 230*a* is T1, and the frequency of the effective current may be f1.

In addition, the period of the a-phase effective current waveform ia1*n*, the b-phase effective current waveform ib1*n*, and the c-phase effective current waveform ic1*n* may be T1, and the frequency may be f1.

Figure 12E:
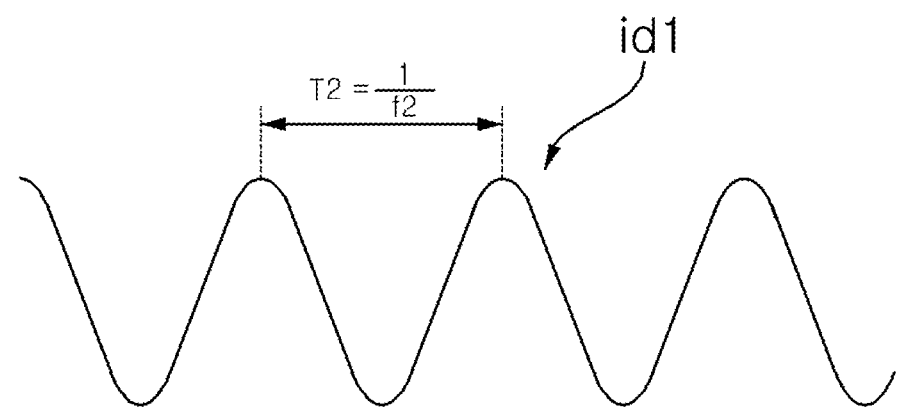

Next, FIG. 12E illustrates the current or the effective current id1 flowing through the single-phase motor 230*b*.

The period of the effective current id1 flowing through the single-phase motor 230*b* is T2 greater than T1, and the frequency is f2 less than f1.

As described above, since the frequency of the effective current id1 flowing through the single-phase motor 230*b* is f2 and the frequency of the effective current flowing through the multi-phase motor 230*a* is f1, the single-phase motor 230*b* and the multi-phase motor 230*a* are driven at different speeds.

In particular, as shown in FIG. 12A, based on the current waveform of io1, the multi-phase motor 230*a* rotates at a speed Wb greater than the speed Wa, and the single-phase motor 230*b* can rotate at a speed Wa based on the current waveform of id1.

In this case, the six switching elements of the inverter 420 may perform a switching operation, except that all of the upper switching elements Sa to Sc are turned on or all of the lower switching elements S'a to S'c are turned on.

Meanwhile, when comparing FIGS. 12A to 12E with FIGS. 11A to 11F, it is preferable that the number of frequencies of the current input to the multi-phase motor 230*a* in the case of the different speed mode of the single-phase motor 230*b* and the multi-phase motor 230*a* is greater than in the case of the same speed mode of the single-phase motor 230*b* and the multi-phase motor 230*a*.

For example, it is preferable that when the single-phase motor 230*b* and the multi-phase motor 230*a* are driven at the same speed, the frequency of the current input to the multi-phase motor 230*a* is one as fo, as shown in FIGS. 11D and 11F, and when the single-phase motor 230*b* and the multi-phase motor 230*a* are driven at different speeds, the frequency of the current input to the multi-phase motor 230*a* is two or more, as f1 and f2 of FIGS. 12D and 12E.

Meanwhile, the inverter controller 430 may control the multi-phase motor 230*a* and the single-phase motor 230*b* to be driven by effective current of a different frequency, when driving the multi-phase motor 230*a* and the single-phase motor 230*b* at different speeds.

For example, when driving the single-phase motor 230*b* and the multi-phase motor 230*a* at different speeds, the inverter controller 430 can control the frequency of the effective current of the multi-phase motor 230*a* and the frequency of the effective current of the single-phase motor 230*b* to be different. Depending on the frequency of the effective current, the single-phase motor 230*b* and the multi-phase motor 230*a* can be driven at different speeds.

Meanwhile, the inverter controller 430 may control the magnitude of the effective current of the multi-phase motor 230*a* and the magnitude of the effective current of the single-phase motor 230*b* to be different. According to this, the torque of the multi-phase motor 230*a* and the torque of the single-phase motor 230*b* are different.

Meanwhile, the current waveform io1 of FIG. 12B corresponds to the sum of a plurality of sine waves, and in particular, may correspond to the sum of the current waveform of FIG. 12D and the current waveform of id1 of FIG. 12E.

For example, the effective current corresponding to the multi-phase motor 230*a* may correspond to each phase current waveform of FIG. 12D, and the effective current corresponding to the single-phase motor 230*b* may correspond to the current waveform of id1.

Accordingly, a plurality of motors serially connected with each other can be stably driven at different speeds, by using a single inverter 420.

After all, by using a single inverter 420, a plurality of motors can be stably driven while preventing a reduction in the voltage utilization of the inverter 420.

Meanwhile, by using a single inverter 420, since it is possible to change the voltage utilization ratios of a plurality of motors serially connected with each other, efficient operation of the plurality of motors can be achieved.

FIG. 13A to FIG. 13G are diagrams showing a single-phase motor driving mode of the single driving mode.

Due to the series connection of the multi-phase motor 230*a* and the single-phase motor 230*b*, it is necessary to make the effective current flowing through the multi-phase motor 230*a* to be zero for the single driving of the single-phase motor 230*b*.

Figure 13A:
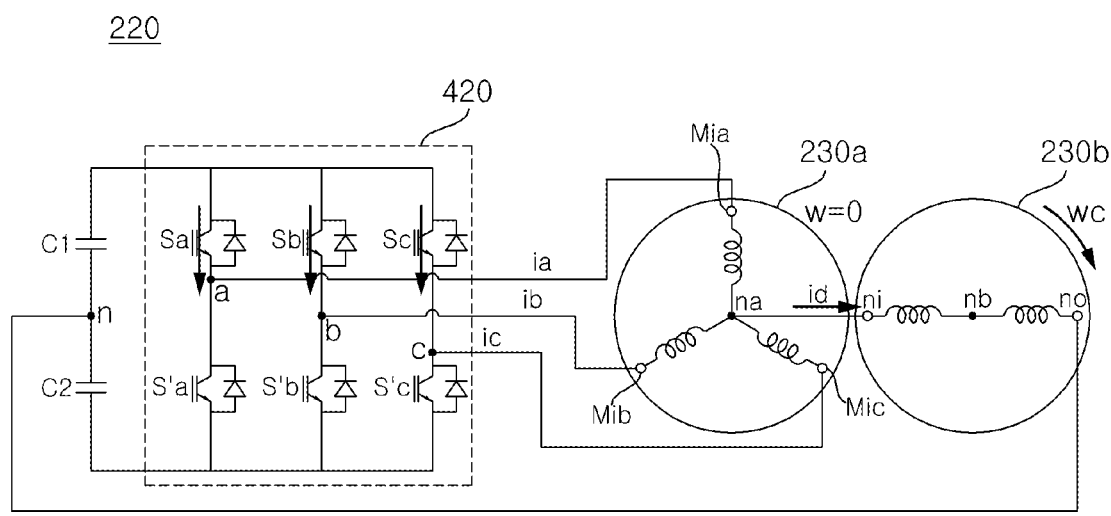
FIGS. 13A to 13G are diagrams referenced to explain a single driving mode of a single-phase motor among a multi-phase motor and a single-phase motor.

Accordingly, in the present disclosure, for the single driving of the single-phase motor 230*b*, as shown in FIG. 13A, among the six switching elements of the inverter 420, all of the upper switching elements Sa to Sc are turned on or all of the lower switching elements S'a to S'c are turned on. This case may be referred to as switching by a zero vector.

Meanwhile, when at least the multi-phase motor 230*a*, among the single-phase motor 230*b* and the multi-phase motor 230a, is driven, a part of the upper switching elements Sa, Sb, and Sc of the inverter 420 may be turned on, and remaining part may be turned off, or a part of the lower switching elements S'a, S'b, and S'c of the inverter 420 may be turned on, and remaining part may be turned off.

Meanwhile, according to the switching by a zero vector, since the phase of the current flowing in each phase is the same, the torque is not generated by the current flowing in the multi-phase motor 230a.

That is, according to the switching by the zero vector, the inverter 420 and the multi-phase motor 230a form a closed loop, and eventually torque is not generated.

Meanwhile, the sum of the currents flowing in each phase through the multi-phase motor 230a flows to the single-phase motor 230b. Therefore, the single-phase motor 230b rotates.

Figure 13B:
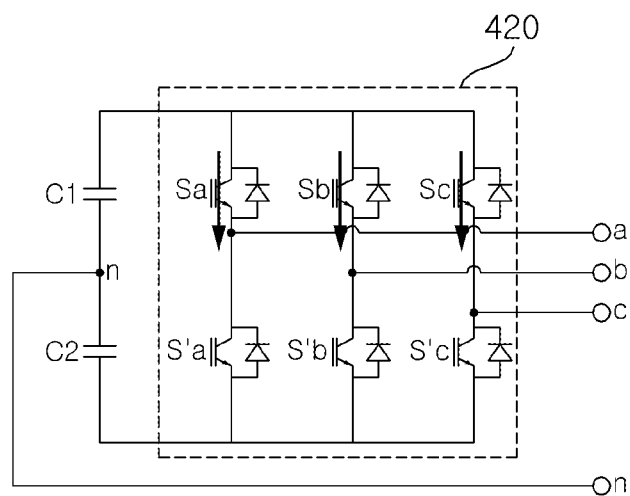

FIG. 13B illustrates that all of the upper switching elements Sa to Sc, among the six switching elements of the inverter 420, are turned on.

Figure 13C:
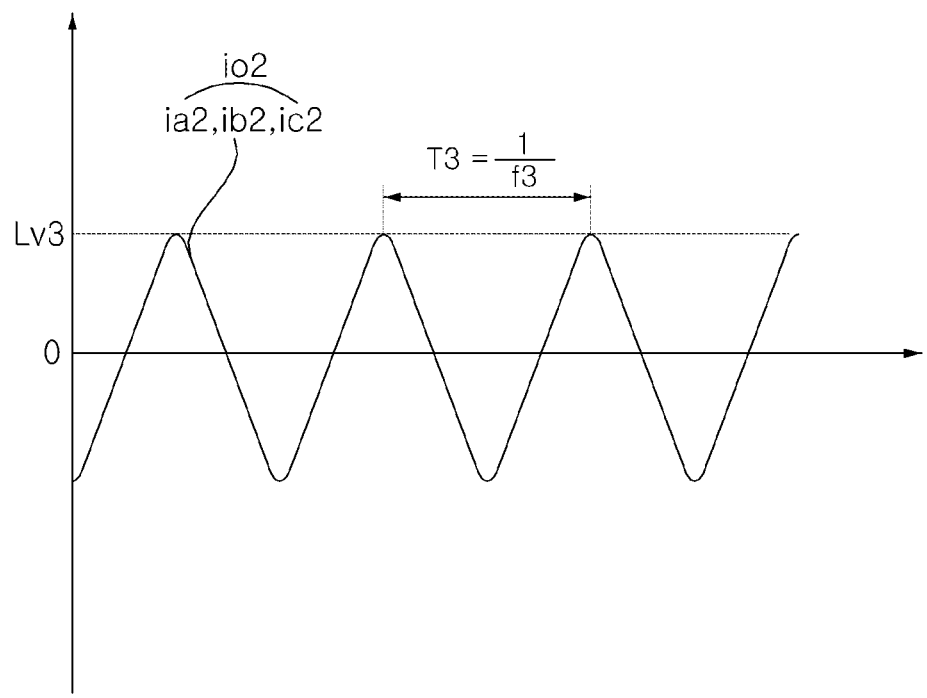

Accordingly, the output current waveform output from the inverter 420 may be illustrated as io2, as shown in FIG. 13C.

The output current waveform io2 output from the inverter 420 may contain a-phase output current waveform ia2, b-phase output current waveform ib2, and c-phase output current waveform ic2.

Meanwhile, unlike FIG. 11B or FIG. 11D, all of the a-phase output current waveform ia2, the b-phase output current waveform ib2, and the c-phase output current waveform ic2 in FIG. 13C have the same phase and have the same frequency.

That is, when only the single-phase motor 230b is driven, unlike the simultaneous driving mode or the single driving of multi-phase motor 230a, the phase of each phase current waveform of the output current waveform output from the inverter 420 may be the same.

That is, since the switching by the zero vector is performed in the inverter 420, the output current waveform io2 output from the inverter 420 may be illustrated as shown in FIG. 13C.

Figure 13D:
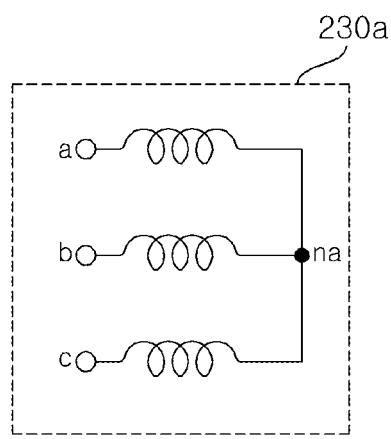
Figure 13E:
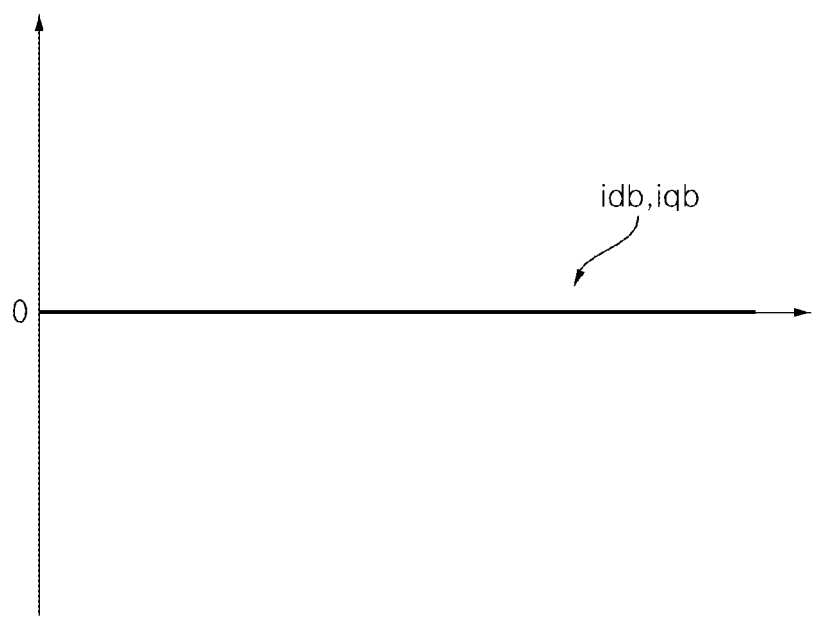

Meanwhile, FIGS. 13D and 13E illustrates an effective current flowing through an internal coil of the multi-phase motor 230a.

FIG. 13D illustrates the internal coil of the multi-phase motor 230a, and FIG. 13E illustrates the d-axis effective current idb and q-axis effective current iqb based on the synchronous coordinate system or the rotating coordinate system.

When the multi-phase motor 230a is a surface-mounted permanent magnet synchronous motor (SMPMSM), unlike FIG. 11E, FIG. 13E illustrates that the level of the d-axis effective current idb as well as the q-axis effective current iqb is also 0.

Accordingly, the level of the effective current of the multi-phase motor 230a is 0, and the frequency also becomes 0.

That is, due to the switching by the zero vector, current flows through the three-phase coil of the multi-phase motor 230a, but the effective current becomes 0, and eventually, the multi-phase motor 230a does not rotate and stops.

Figure 13F:
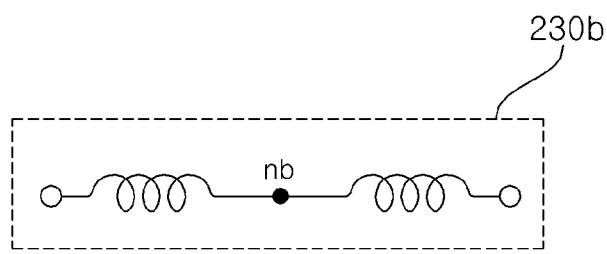
Figure 13G:
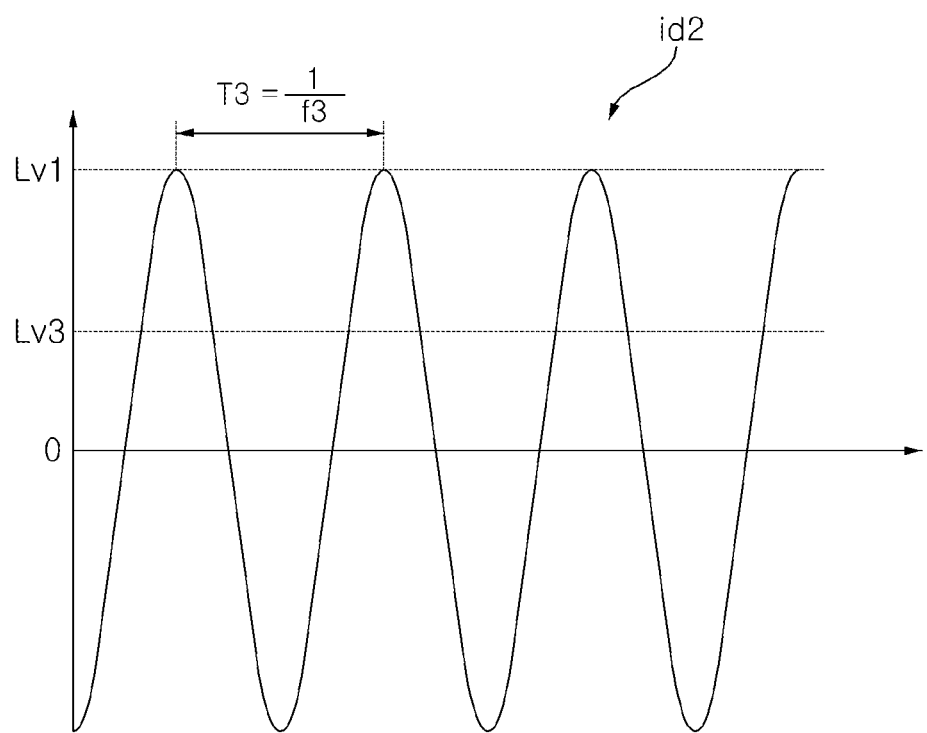

Next, FIGS. 13F and 13G illustrate a current waveform or an effective current waveform flowing through the single-phase motor 230b.

FIG. 13F illustrates the internal coil of the single-phase motor 230b, and FIG. 13G illustrates the current waveform or the effective current id2 flowing through the single-phase motor 230b.

The maximum level of the effective current id1 flowing through the single-phase motor 230b is Lv1, the period is T3, and the frequency is f3.

Accordingly, the single-phase motor 230b rotates at the speed Wc according to the frequency f3.

At this time, the maximum level LV1 of the effective current id1 flowing through the single-phase motor 230b is greater than the maximum level LV3 of the output current waveform io2 output from the inverter 420 of FIG. 13B or each phase output current waveform ia2, ib2, ic2, and may be approximately three times.

As described above, by using the zero vector switching for the multi-phase motor 230a and the single-phase motor 230b serially connected, it is possible to drive only the single-phase motor 230b.

FIG. 14A to FIG. 14E are diagrams showing a multi-phase motor driving mode of the single driving modes.

Figure 14A:
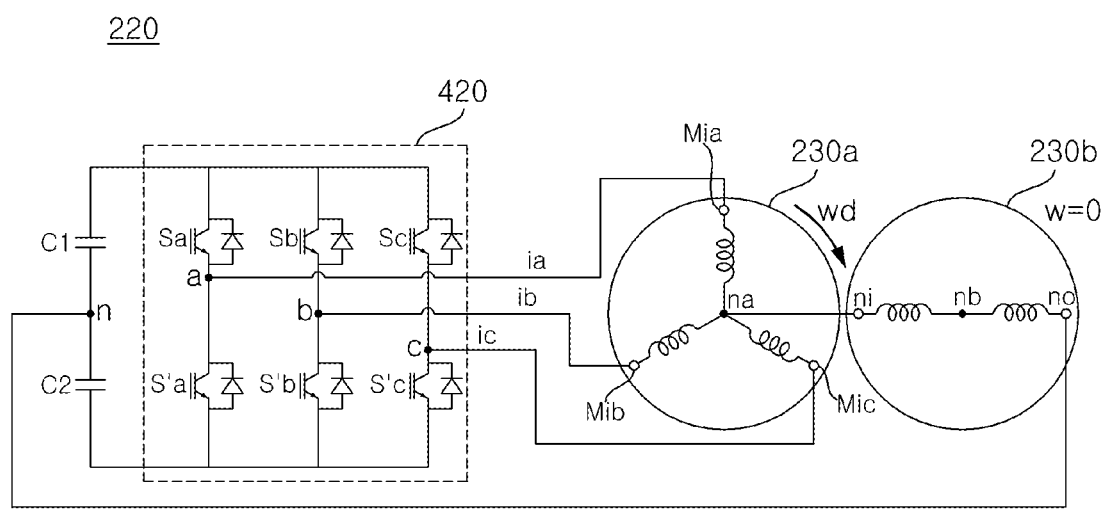
FIGS. 14A to 14E are diagrams referenced to explain a single driving mode of a multi-phase motor among a multi-phase motor and a single-phase motor.
Figure 14B:
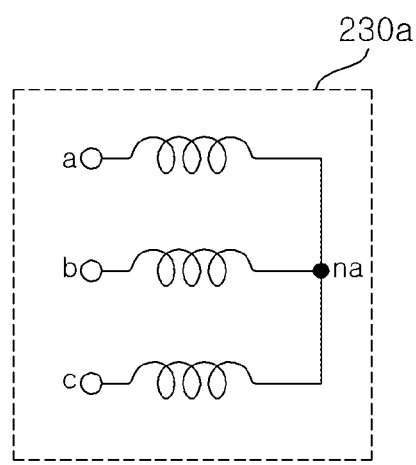

Due to the series connection of the multi-phase motor 230a and the single-phase motor 230b, as shown in FIG. 14A, it is necessary to make the effective current flowing through the single-phase motor 230b to be zero for the single driving of the multi-phase motor 230a.

Accordingly, in the present disclosure, in order to perform the single driving of the multi-phase motor 230a, a part of the upper switching elements Sa, Sb, and Sc of the inverter 420 may be turned on, and remaining part may be turned off, or a part of the lower switching elements S'a, S'b, and S'c of the inverter 420 may be turned on, and remaining part may be turned off, and the electric potential between the motor neutral point na and the DC terminal neutral point n is set to be the same.

Meanwhile, similarly, when at least the single-phase motor 230b among the multi-phase motor 230a and the single-phase motor 230b are driven, the electric potential between the motor neutral point na and the DC terminal neutral point n should be set to be different.

Figure 14C:
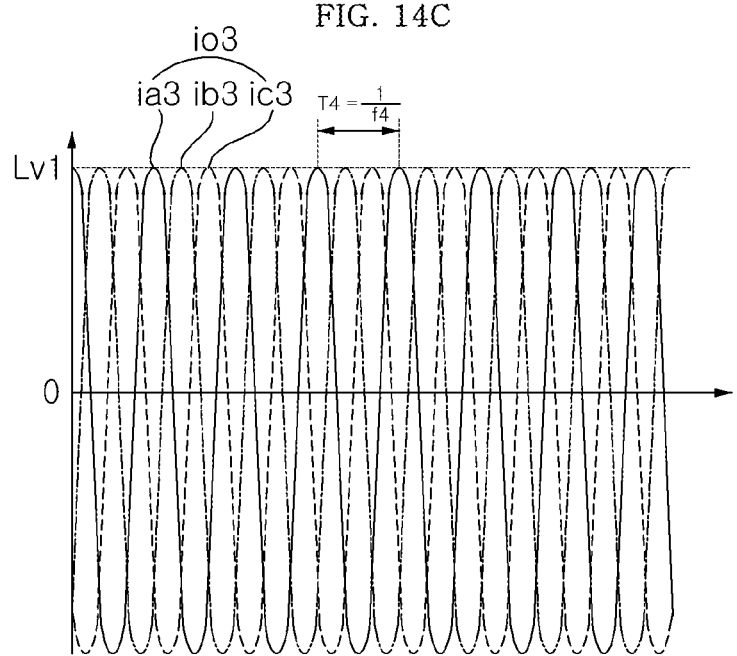

The output current waveform output from the inverter 420 may be illustrated as io3, as shown in FIG. 14C.

The output current waveform io3 output from the inverter 420 may include a-phase output current waveform ia3, b-phase output current waveform ib3, and c-phase output current waveform ic3 that have the same size and different phases.

Meanwhile, the inverter controller 430 may calculate the neutral point voltage of the multi-phase motor 230a.

For example, the inverter controller 430 may calculate the neutral point voltage Vna of the multi-phase motor 230a, based on the DC terminal voltage (Vdc1+Vdc2), and the current io3 detected by the first current detector E1 or each phase current ia3, ib3, ic3.

Specifically, the inverter controller 430 may calculate the neutral point voltage Vna of the multi-phase motor 230a based on the phase voltage Van, Vbn, Vcn of the multi-phase motor 230a.

The following Equation 5 represents the calculation of the neutral point voltage Vna of the multi-phase motor 230a.

$$Vna=(Van+Vbn+Vcn)/3 \qquad \text{[Equation 5]}$$

Here, Vna indicates the neutral point voltage of the multi-phase motor 230a, Van indicates the voltage between node a and node n, Vbn indicates the voltage between node b and node n, and Vcn indicates the voltage between node c and node n.

Meanwhile, since there are two capacitors disposed in the DC terminal, it is necessary to calculate the DC terminal neutral point voltage Vn.

Accordingly, the inverter controller 430 may calculate the DC terminal neutral point voltage Vn, based on the DC terminal voltage (Vdc1+Vdc2).

Specifically, the inverter controller 430 may calculate the DC terminal neutral point voltage Vn, based on a first DC voltage Vdc1 from a first voltage detector B1 for detecting the DC voltage of both ends of the first capacitor, and a second DC voltage Vdc2 from a second voltage detector B2 for detecting the DC voltage of both ends of the second capacitor.

In addition, when driving only the multi-phase motor 230a, the inverter controller 430 may control the electric potential between the motor neutral point na and the DC terminal neutral point n to be the same.

That is, the inverter controller 430 may control the calculated neutral point voltage Vna of the multi-phase motor 230a and the calculated DC terminal neutral point voltage Vn to be the same.

Figure 14D:
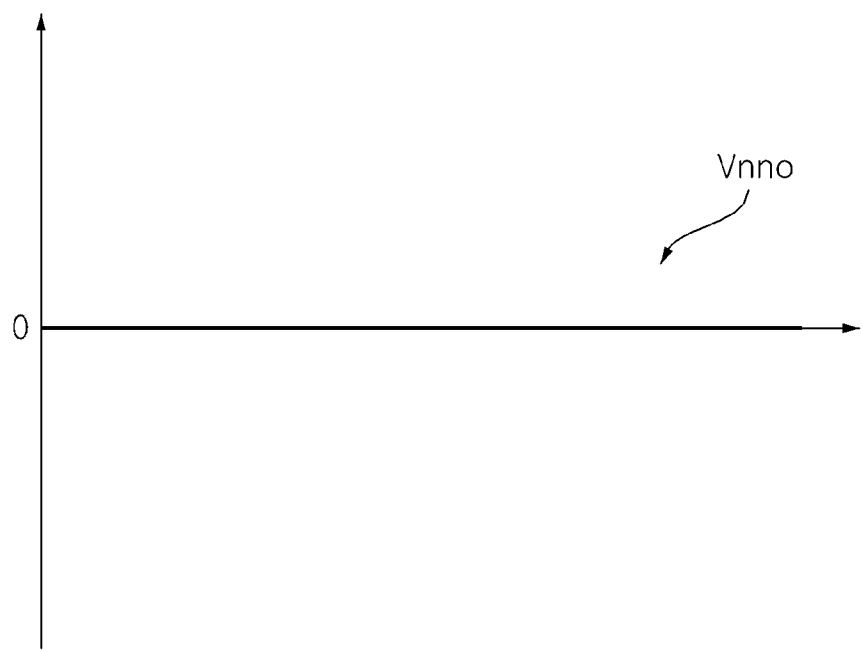

FIG. 14D illustrates that the voltage Vnno, which is the potential difference between a motor neutral point na and a DC terminal neutral point n, has a level of zero.

Accordingly, the current io3 flowing through the internal coil of the multi-phase motor 230a of FIG. 14C is completely consumed by the multi-phase motor 230a, and no current flows through the single-phase motor 230b.

Figure 14E:
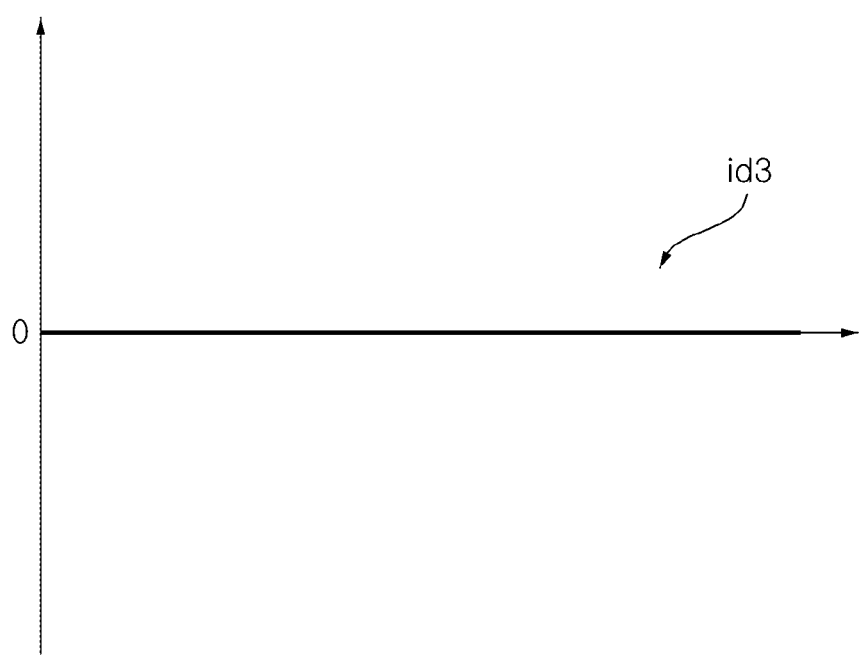

That is, as shown in FIG. 14E, the current flowing through the single-phase motor 230b or the effective current id3 becomes 0. Therefore, as shown in FIG. 14A, the single-phase motor 230b is stopped, and only the multi-phase motor 230a can rotate at the speed Wd.

Figure 15A:
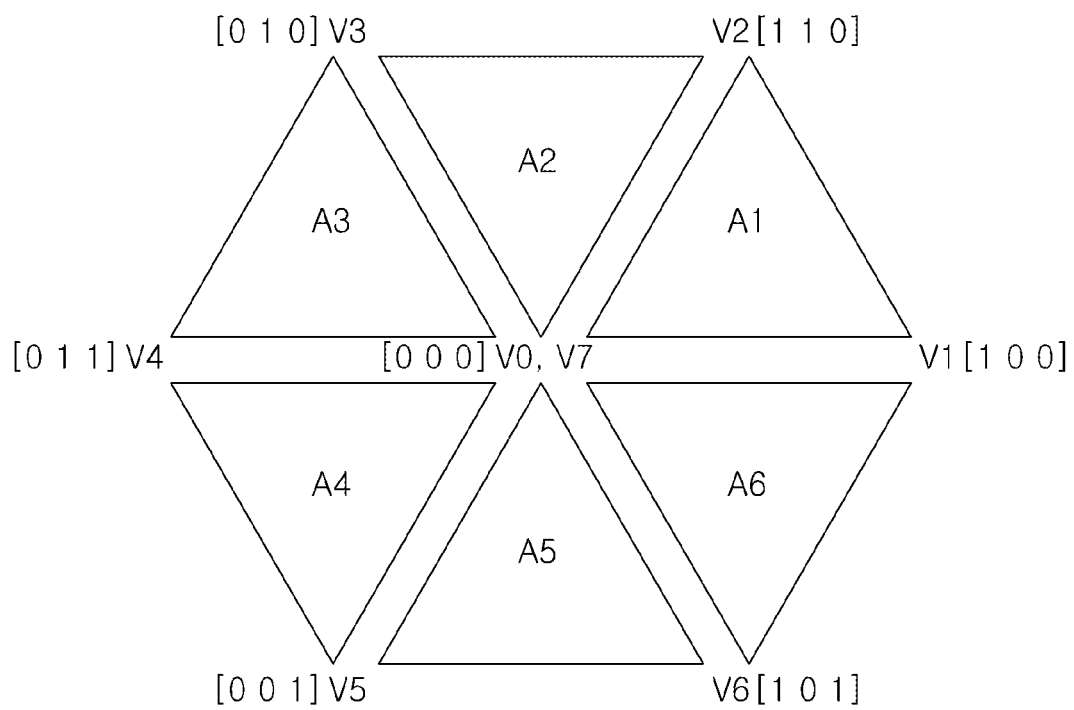
FIGS. 15A to 15C are diagrams for explaining an inverter switching based on a spatial vector.
Figure 15B:
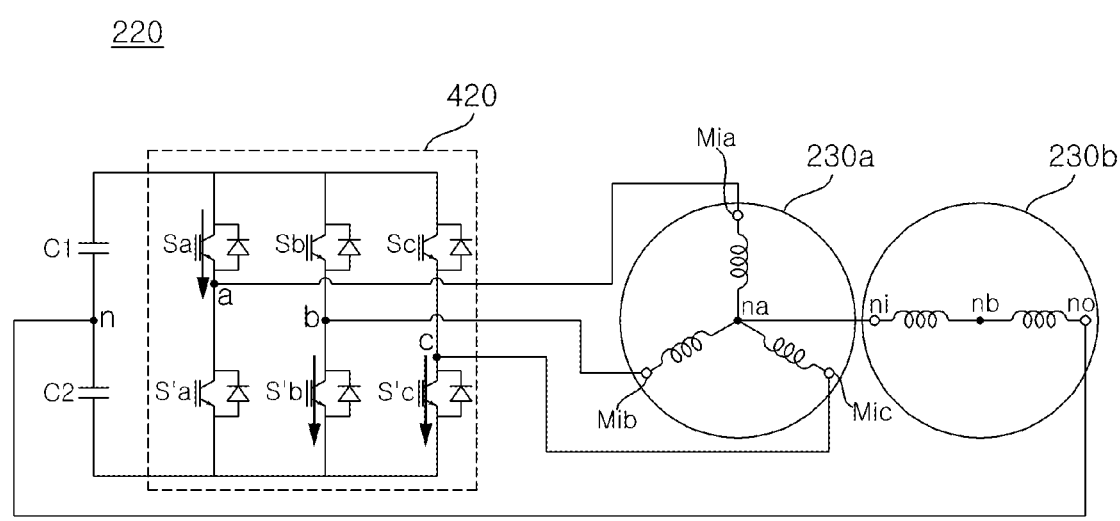
Figure 15C:
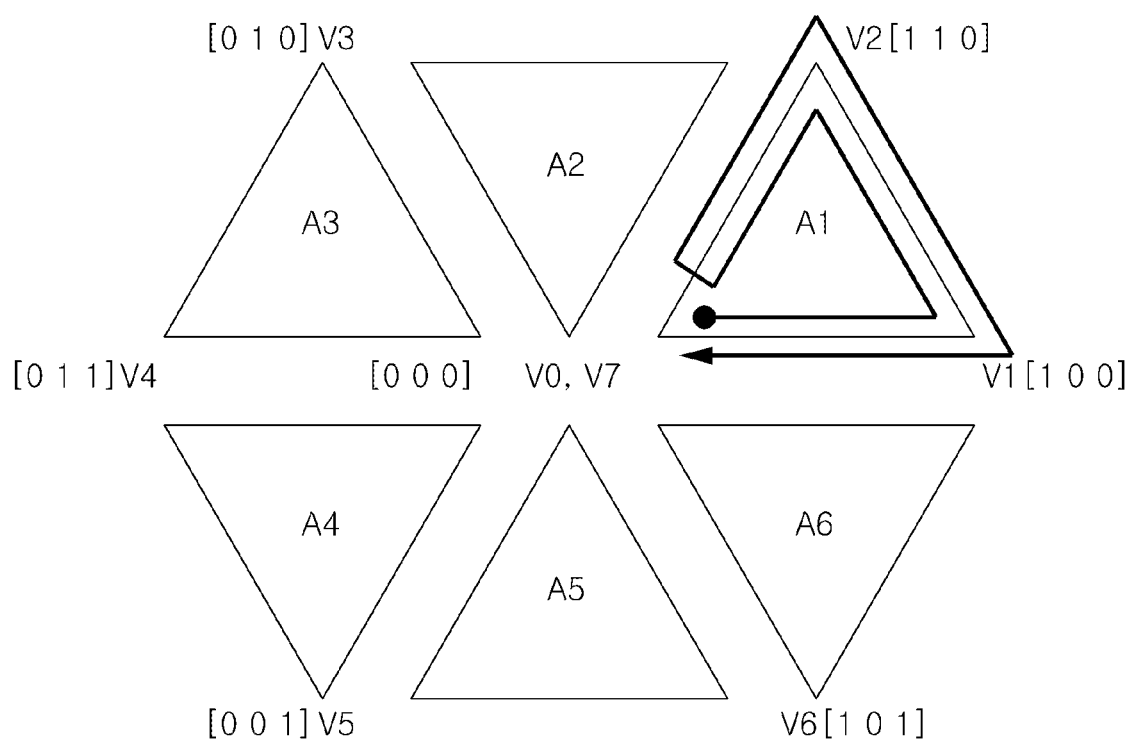

FIG. 15A to FIG. 15C are diagrams for describing inverter switching based on a spatial vector.

First, FIG. 15A illustrates six valid vectors and two zero vectors or invalid vectors.

Six valid vectors are illustrated as (1 0 0), (1 1 0), (0 1 0), (0 1 1), (0 0 1), (1 0 1), and the two zero vectors are illustrated as (0 0 0), (1 1 1).

According to the (1 0 0) vector, as shown in FIG. 15B, Sa, S'b, S'c switching elements are turned on, and S'a, Sb, Sc switching elements are turned off. Accordingly, the multi-phase motor 230a and the single-phase motor 230b can rotate.

Next, as shown in FIG. 15C, according to the (1 1 0) vector, Sa, Sb, S'c switching elements are turned on, and S'a, S'b, Sc switching elements are turned off. Accordingly, the multi-phase motor 230a and the single-phase motor 230b can rotate.

Figure 16A:
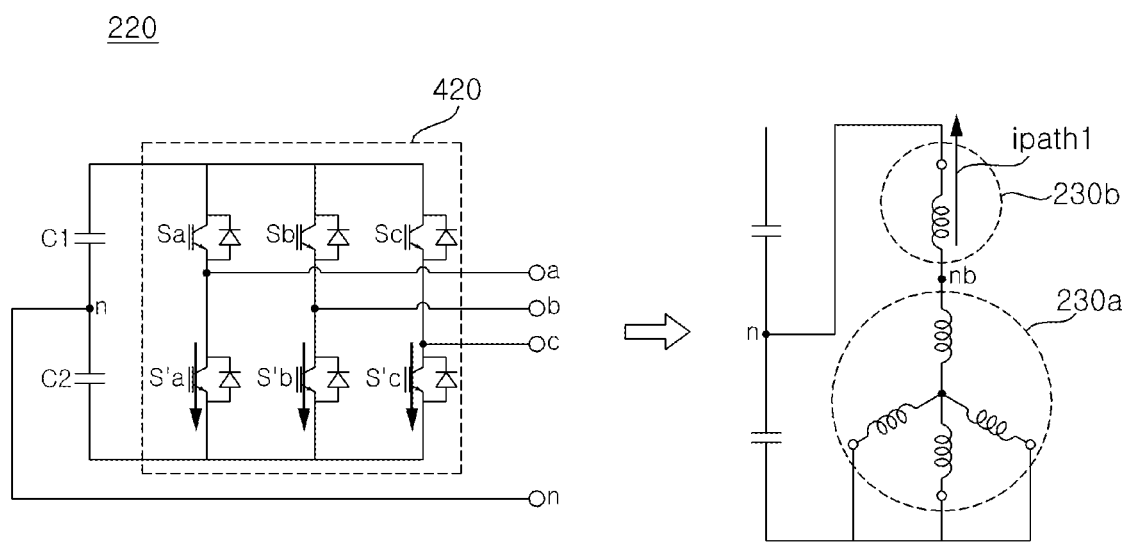
FIGS. 16A and 16B are diagrams for explaining an inverter switching based on a zero vector.

FIG. 16A illustrates that according to the (0 0 0) vector, the S'a, S'b, S'c switching elements are turned on, and the Sa, Sb, Sc switching elements are turned off. Accordingly, the multi-phase motor 230a is stopped, and only the single-phase motor 230b is rotated.

Accordingly, the current flowing through the single-phase motor 230b flows in the direction of ipat21.

Figure 16B:
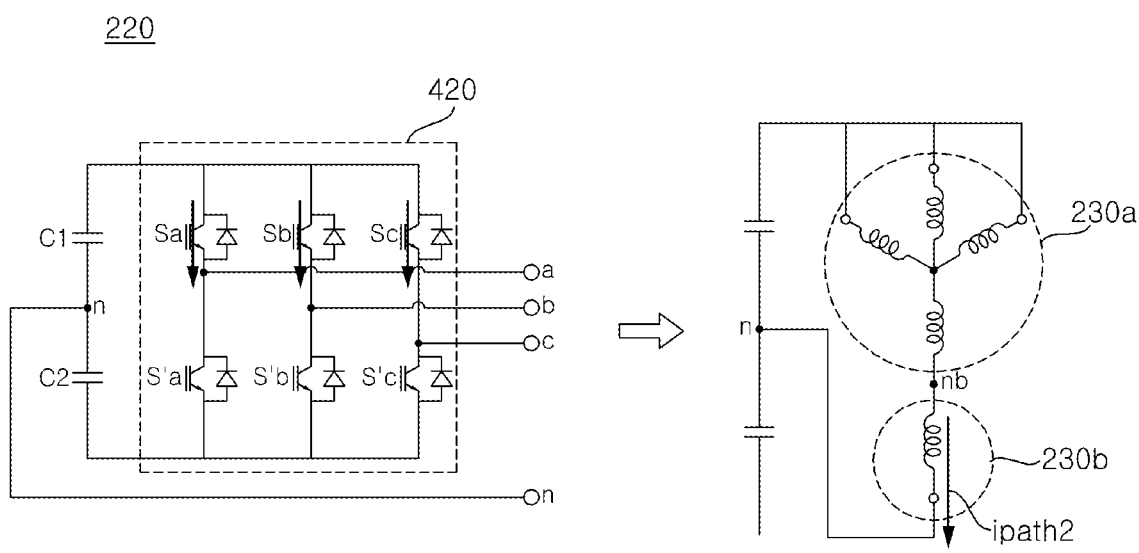

Next, FIG. 16B illustrates that according to the (1 1 1) vector, Sa, Sb, Sc switching elements are turned on, and S'a, S'b, S'c switching elements are turned off. Accordingly, the multi-phase motor 230a is stopped, and only the single-phase motor 230b is rotated.

As described above, by using the zero vector switching for the multi-phase motor 230a and the single-phase motor 230b serially connected, only the single-phase motor 230b can be driven.

Meanwhile, in the device for driving a plurality of motors 220 according to the embodiment of the present disclosure described in FIGS. 1 to 16B, it is preferable that the operation period of the single-phase motor 230b is shorter than that of the multi-phase motor 230a.

Accordingly, a plurality of motors serially connected with each other can be stably driven by using a single inverter.

Meanwhile, in the device for driving a plurality of motors 220 according to the embodiment of the present disclosure, it is preferable that the average effective current of the single-phase motor 230b is smaller than the average effective current of the multi-phase motor 230a.

Accordingly, a plurality of motors serially connected with each other can be stably driven by using a single inverter.

Meanwhile, in the device for driving a plurality of motors 220 according to an embodiment of the present disclosure, the multi-phase motor 230a may include a fan motor, and the single-phase motor 230b may include a pump motor.

It is preferable that the operation period of the fan motor of the multi-phase motor 230a is longer than that of the pump motor of the single-phase motor 230b.

The fan motor and the pump motor can be driven at different speeds at the same time. In addition, it is possible to drive at the same speed, and it is also possible to operate only the fan motor or the pump motor.

Meanwhile, the above-described device for driving a plurality of motors 220 may be applied to various electric apparatuses. For example, it can be applied to a laundry treatment device, a dryer, a dishwasher, an air conditioner, a refrigerator, a water purifier, a cleaner, a vehicle, a robot, a drone, and the like, among electric apparatuses.

For example, an electric apparatus 200 is an electric device for user and, for example, a refrigerator (200c in FIG. 17), a washing machine (200a in FIG. 17), an air conditioner (200d in FIG. 17), a cooking appliance (200e in FIG. 17), a cleaner (200f in FIG. 17), and the like may be exemplified.

FIG. 17A to FIG. 17F are diagrams for explaining various examples of electric apparatuses.

Figure 17A:
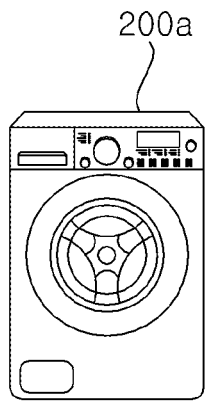
FIGS. 17A to 17F are diagrams for explaining various examples of an electric apparatus.

First, FIG. 17A illustrates a laundry treatment device 200a as an example of an electric device. The laundry treatment device 200a may include a washing machine, a dryer, a clothing manager, and the like.

Figure 17B:
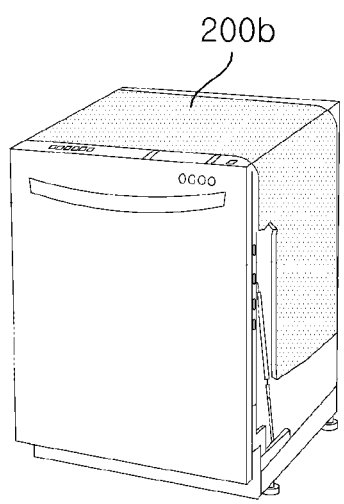
Figure 17C:
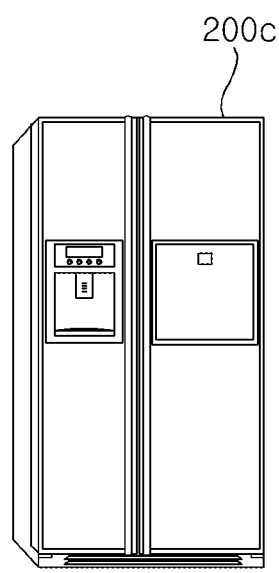
Figure 17D:
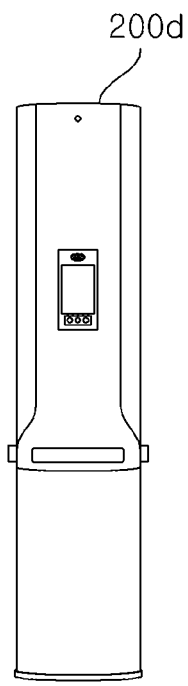

Next, FIG. 17B illustrates a dishwasher 200b as an example of the electric device, FIG. 17C illustrates a refrigerator 200c as an example of the electric device, and FIG. 17D is an air conditioner 200d as an example of the electric device.

Meanwhile, the air conditioner 200d may include an air conditioner, an air purifier, and the like.

Figure 17E:
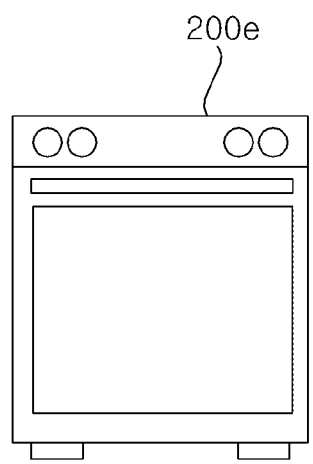
Figure 17F:
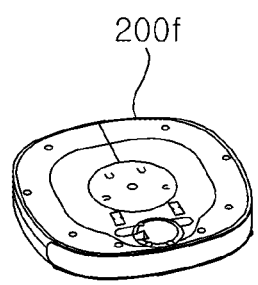

Next, FIG. 17E illustrates a cooking appliance 200e as an example of the electric device, and FIG. 17F illustrates a robot cleaner 200f as an example of the electric device.

Meanwhile, although not shown in FIGS. 17A to 17F, as an electric device, a water purifier, a vehicle, a robot, a drone, and the like may be included.

Figure 18:
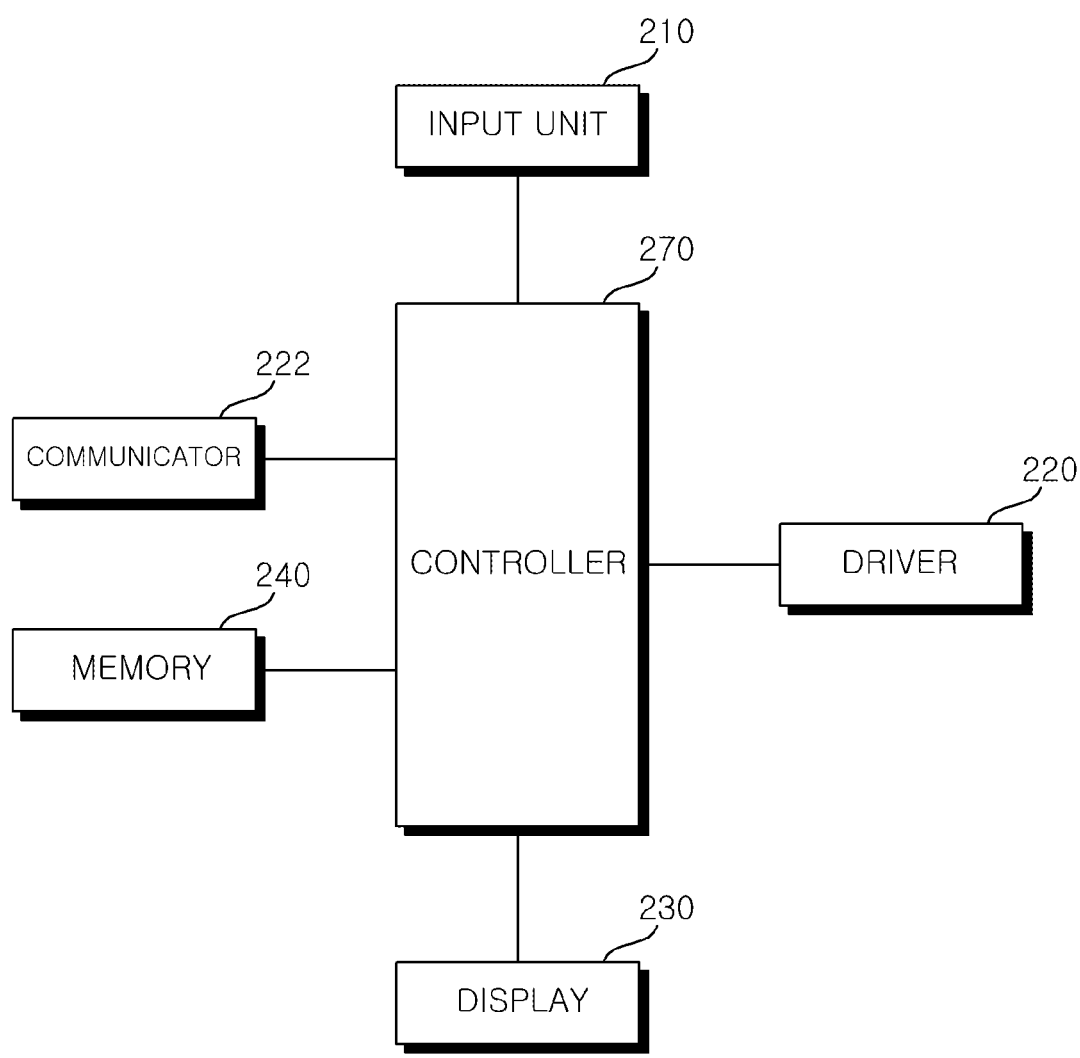
FIG. 18 is a simplified internal block diagram of the electric apparatus of FIGS. 17A to 17F.

FIG. 18 is a simplified internal block diagram of the electric apparatus of FIGS. 17A to 17F.

Referring to the drawing, the electric apparatus 200 may include an input unit 210 for user input, a display 230 for displaying an operating state of the electric apparatus, a communicator 222 for communicating with other external device, a driver 220 for driving an electric apparatus, and a controller 270 for internal control.

The driver 220 may correspond to the device for driving motor described above with reference to FIGS. 1 to 16B.

For example, when the electric device is a laundry treatment device 200a, the driver 220 may drive a fan motor and a pump motor that are electrically serially connected, by using a single inverter 420.

As another example, when the electric device is the dishwasher 200b, the driver 220 may drive a fan motor and a washing motor electrically serially connected, by using a single inverter.

As another example, when the electric device is the refrigerator 200c, the driver 220 may drive a plurality of fan motors electrically serially connected, by using a single inverter.

As another example, when the electric device is the air conditioner 200d, the driver 220 may drive a plurality of fan motors electrically serially connected, by using a single inverter.

As another example, when the electric device is the cooking appliance 200e, the driver 220 may drive a plurality of fan motors electrically serially connected, by using a single inverter.

As another example, when the electric device is a cleaner 200f, the driver 220 may drive a plurality of fan motors electrically serially connected, by using a single inverter.

Figure 19:
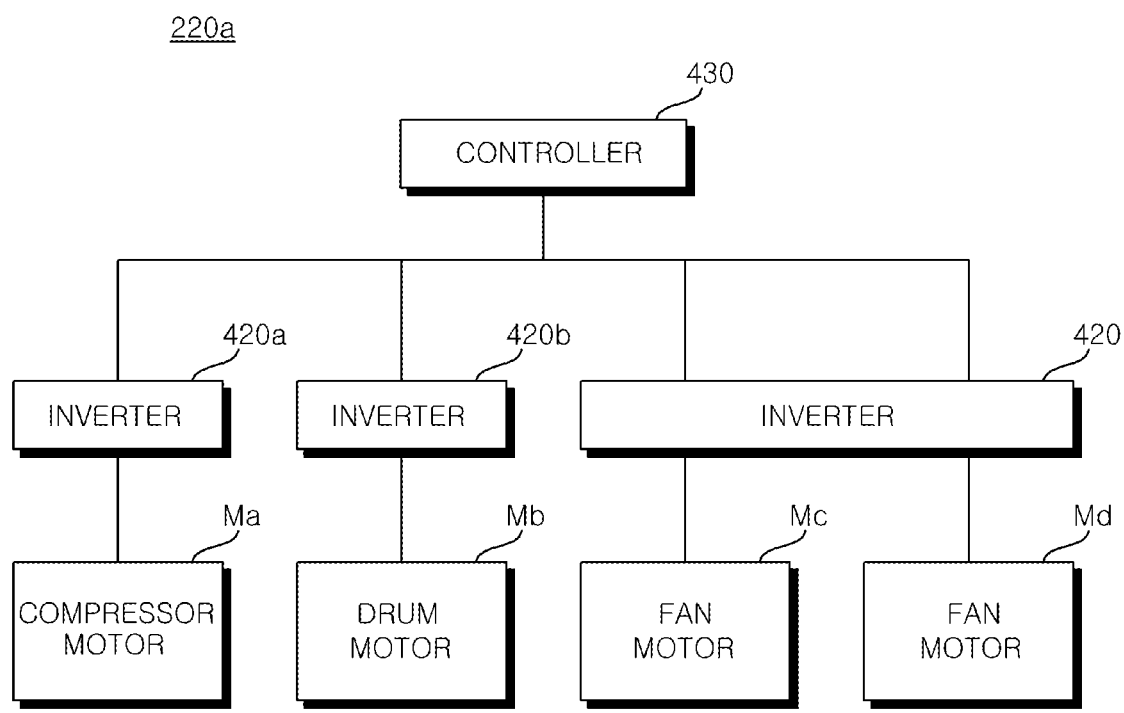
FIG. 19 is an example of a device for driving a plurality of motors according to an embodiment of the present disclosure.

FIG. 19 is an example of a device for driving a plurality of motors according to an embodiment of the present disclosure.

Referring to the drawing, the device for driving a plurality of motors 220 according to the present disclosure may include a single controller 430, a plurality of inverters 420a, 420b, 420d, and a plurality of motors Ma to Md.

In this case, when the device for driving a plurality of motors are a laundry treatment device, particularly, a drive device of a dryer, the plurality of motors Ma to Md may be a compressor motor, a drum motor, a fan motor, and a pump motor, respectively, but are not limited thereto, and various modifications are possible.

Meanwhile, unlike FIG. 1, some inverter 420, among a plurality of inverters 420a, 420b, and 420d, may drive a plurality of motors Mc to Md, by using a single inverter 420.

To this end, a plurality of motors Mc to Md may be connected in parallel with each other, or may be serially connected with each other.

Meanwhile, when a plurality of motors Mc to Md are connected in parallel with each other, the current output from the inverter 420 is distributed to each motor. Therefore, the voltage utilization of the inverter may be lowered to almost half, and voltage imbalance may occur between the plurality of capacitors disposed the DC terminal. According to the imbalance, the driving efficiency of the motor may be reduced due to current harmonics, torque pulsation of the motor, speed pulsation of the motor, noise increase, or the like.

Accordingly, in the present disclosure, a plurality of motors Mc to Md can be serially connected with each other.

Meanwhile, unlike the drawing, the controller 430 may control the inverter 420, and other controller (not shown) may control the plurality of inverters 420a and 420b.

Meanwhile, as shown in the drawing, when a plurality of motors Mc to Md are driven by using a single inverter 420, the number of inverters is reduced in comparison with FIG. 1 or the like, thereby reducing manufacturing cost.

The device for driving a plurality of motors according to the embodiment of the present disclosure and the electric apparatus having the same are not limitedly applied to the configuration and method of the embodiments described above, but may be configured by selectively combining all or part of respective embodiments so that the embodiments can be variously modified.

Meanwhile, the method for driving a plurality of motors or the method for operating an electric device according to the present disclosure may be implemented as a code readable by a processor on a recording medium readable by a processor provided in a motor driving device or an electric apparatus. The processor-readable recording medium includes all types of recording devices in which data that can be read by the processor are stored.

As described above, a device for driving a plurality of motors and an electric apparatus having the same according to an embodiment of the present disclosure include an inverter connected to a DC terminal, a multi-phase motor connected to the inverter, a single-phase motor serially connected to the multi-phase motor, and a first capacitor and a second capacitor serially connected to both ends of the DC terminal, wherein the single-phase motor is connected to the multi-phase motor, and a node between the first capacitor and the second capacitor. Accordingly, a plurality of motors serially connected with each other can be driven by using a single inverter. In addition, by using a single inverter, it is possible to drive a plurality of motors serially connected with each other in various modes. As a result, it is possible to stably drive a plurality of motors while preventing the reduction of the voltage utilization rate of the inverter, by using a single inverter.

Meanwhile, a neutral point of the multi-phase motor is connected to one end of the single phase motor, and the other end of the single-phase motor is connected to the node between the first capacitor and the second capacitor. Accordingly, a plurality of motors serially connected with each other can be stably driven by using a single inverter.

Meanwhile, an input terminal of the single-phase motor is electrically connected to a node to which each phase of the multi-phase motor is commonly connected, and an output terminal no of the single-phase motor is connected to the node between the first capacitor and the second capacitor. Accordingly, a plurality of motors serially connected with each other can be stably driven by using a single inverter.

Meanwhile, a neutral point of the multi-phase motor is connected to one end of the single phase motor, and a DC terminal neutral point, which is the node between the first capacitor and the second capacitor, is connected to the other end of the single-phase motor. Accordingly, a plurality of motors serially connected with each other can be stably driven by using a single inverter.

Meanwhile, the motor neutral point of the multi-phase motor is a node where current becomes zero according to a phase difference in a multi-phase AC system. Accordingly, a plurality of motors serially connected with each other can be stably driven by using a single inverter.

Meanwhile, a device for driving a plurality of motors and an electric apparatus having the same according to an embodiment of the present disclosure may further include a first current detector configured to detect a first current input to the multi-phase motor; and a second current detector configured to detect a second current input to the single-phase motor. Accordingly, a plurality of motors serially connected with each other can be stably driven by using a single inverter.

Meanwhile, a device for driving a plurality of motors and an electric apparatus having the same according to an embodiment of the present disclosure may further include a first voltage detector configured to detect a DC voltage across both ends of the first capacitor, and a second voltage detector configured to detect a DC voltage across both ends of the second capacitor. Accordingly, a plurality of motors serially connected with each other can be stably driven by using a single inverter.

Meanwhile, the current output from the inverter corresponds to a single sine wave, when driving the single-phase motor and the multi-phase motor at the same speed, and corresponds to a sum of a plurality of sine waves, when driving the single-phase motor and the multi-phase motor at different speeds. Accordingly, a plurality of motors serially connected with each other can be stably driven by using a single inverter.

Meanwhile, a device for driving a plurality of motors and an electric apparatus having the same according to an embodiment of the present disclosure may further include a controller configured to control the inverter, and the controller controls to drive the single-phase motor and the multi-phase motor at a same speed, to drive the single-phase motor and the multi-phase motor at different speeds, to drive only the single-phase motor, or to drive only the multi-phase motor. Accordingly, a plurality of motors serially connected with each other can be stably driven in various modes by using a single inverter.

Meanwhile, the number of a frequency of a current input to the multi-phase motor, when driving the single-phase motor and the multi-phase motor at the same speed, is smaller than the number of a frequency of a current input to the multi-phase motor, when driving the single-phase motor and the multi-phase motor at different speeds. Accordingly, a plurality of motors serially connected with each other can be simultaneously driven at different speeds by using a single inverter.

In addition, it is possible to drive a plurality of motors serially connected with each other at different speeds, by using a single inverter.

In addition, it is also possible to drive a plurality of motors serially connected with each other at the same speed, by using a single inverter.

As a result, it is possible to stably drive a plurality of motors while preventing the reduction of the voltage utilization rate of the inverter, by using a single inverter.

Meanwhile, the frequency of the current input to the multi-phase motor is one, when driving the single-phase motor and the multi-phase motor at the same speed, and the frequency of the current input to the multi-phase motor is two or more, when driving the single-phase motor and the multi-phase motor at different speeds. Accordingly, it is possible to drive a plurality of motors serially connected with each other at different speeds, by using a single inverter. In addition, it is also possible to drive a plurality of motors serially connected with each other at the same speed, by using a single inverter.

Meanwhile, the current output from the inverter corresponds to a single sine wave, when driving the single-phase motor and the multi-phase motor at the same speed, and corresponds to a sum of a plurality of sine waves, when driving the single-phase motor and the multi-phase motor at different speeds. Accordingly, a plurality of motors can be simultaneously driven at different speeds, by using a single inverter.

Meanwhile, when driving the single-phase motor and the multi-phase motor at different speeds, the multi-phase motor rotates at a first speed corresponding to the first frequency of the first current input to the multi-phase motor, and the single-phase motor rotate at a second speed corresponding to the second frequency of the second current input to the single-phase motor. Accordingly, it is possible to prevent the voltage utilization rate from lowering while driving a plurality of motors serially connected with each other at different speeds, by using a single inverter.

Meanwhile, when driving the single-phase motor and the multi-phase motor at the same speed, the multi-phase motor and the single-phase motor are driven by an effective current of a same frequency. Accordingly, it is possible to stably drive a plurality of motors serially connected with each other at the same speed, by using a single inverter.

Meanwhile, when driving the single-phase motor and the multi-phase motor at the same speed, in case a maximum level of an effective current of the multi-phase motor and a maximum level of an effective current of the single-phase motor are the same, a torque of the multi-phase motor is greater than a torque of the single-phase motor. Accordingly, the torques of the multi-phase motor and the single-phase motor can be changed.

Meanwhile, when driving the single-phase motor and the multi-phase motor at different speeds, the multi-phase motor and the single-phase motor may be driven by effective currents of a different frequency. Accordingly, it is possible to stably drive a plurality of motors serially connected with each other at different speeds by using a single inverter.

Meanwhile, a device for driving a plurality of motors and an electric apparatus having the same according to an embodiment of the present disclosure may further include a first voltage detector configured to detect a DC voltage across both ends of the first capacitor, a second voltage detector configured to detect a DC voltage across both ends of the second capacitor, a first current detector configured to detect a first current input to the multi-phase motor, and a second current detector configured to detect a second current input to the single-phase motor. Accordingly, a plurality of motors are serially connected with each other, and it is possible to stably drive the plurality of motors while preventing the reduction of voltage imbalance between the first capacitor and the second capacitor and the reduction of the voltage utilization rate of the inverter.

Meanwhile, a device for driving a plurality of motors and an electric apparatus having the same according to an embodiment of the present disclosure may further include a controller, and the controller controls the frequency of the current input to the multi-phase motor to be one, when driving the single-phase motor and the multi-phase motor at the same speed, and controls the frequency of the current input to the multi-phase motor to be two or more, when driving the single-phase motor and the multi-phase motor at different speeds. Accordingly, it is possible to stably drive a plurality of motors serially connected with each other at different speeds, by using a single inverter. In addition, it is possible to stably drive a plurality of motors serially connected with each other at the same speed, by using a single inverter.

Meanwhile, the controller may calculate the neutral point voltage of the multi-phase motor. Accordingly, a plurality of motors serially connected with each other can be stably driven, by using a single inverter.

Meanwhile, the operation period of the single-phase motor may be shorter than that of the multi-phase motor. Accordingly, a plurality of motors serially connected with each other can be stably driven, by using a single inverter.

Meanwhile, when driving the single-phase motor and the multi-phase motor at different speeds, different currents flow through the multi-phase motor and the single-phase motor, and when driving only the multi-phase motor, a current flows through the multi-phase motor, and no current flows through the single-phase motor.

Accordingly, it is possible to stably drive a plurality of motors serially connected with each other at different speeds, by using a single inverter. In addition, it is possible to stably drive only a multi-phase motor among a plurality of motors serially connected with each other, by using a single inverter.

Meanwhile, when driving the single-phase motor and the multi-phase motor at different speeds, a first current having a first frequency and a second frequency is input to the multi-phase motor, and a second current having the second frequency is input to the single-phase motor. Accordingly, it is possible to simultaneously drive a plurality of motors serially connected with each other at different speeds, by using a single inverter.

Meanwhile, when driving the single-phase motor and the multi-phase motor at the same speed, a third current having a third frequency is input to the multi-phase motor, and a fourth current having the third frequency is input to the single-phase motor. Accordingly, it is possible to simultaneously drive a plurality of motors serially connected with each other at the same speed, by using a single inverter.

Meanwhile, a device for driving a plurality of motors and an electric apparatus having the same according to another embodiment of the present disclosure may further include a controller, and the controller controls to flow different currents through the multi-phase motor and the single-phase motor, when driving the single-phase motor and the multi-phase motor at different speeds, and controls to flow current through the multi-phase motor, and to flow no current through the single-phase motor. Accordingly, it is possible to stably drive a plurality of motors serially connected with each other at different speeds, by using a single inverter. In addition, it is possible to stably drive only the multi-phase motor among a plurality of motors serially connected with each other, by using a single inverter.

Meanwhile, when driving at least the single-phase motor among the single-phase motor and the multi-phase motor, an electric potential between a motor neutral point of the multi-phase motor and a DC terminal neutral point between the first capacitor and the second capacitor is different. Accordingly, it is possible to stably drive a plurality of motors serially connected with each other at different speeds, by using a single inverter.

Meanwhile, when driving only the multi-phase motor, an electric potential between the motor neutral point and the DC terminal neutral point is the same. Accordingly, it is possible to stably drive only the multi-phase motor among a plurality of motors serially connected with each other using one inverter.

Meanwhile, a device for driving a plurality of motors and an electric apparatus having the same according to another embodiment of the present disclosure may further include a controller, and the controller controls an electric potential between a motor neutral point of the multi-phase motor and a DC terminal neutral point between the first capacitor and the second capacitor to be different, when driving at least the single-phase motor among the single-phase motor and the multi-phase motor, and controls an electric potential between the motor neutral point and the DC terminal neutral point to be the same, when driving only the multi-phase motor. Accordingly, it is possible to drive a plurality of motors serially connected with each other at different speeds, or to stably drive only the multi-phase motor among a plurality of motors, by using a single inverter.

Meanwhile, the controller of the device for driving a plurality of motors according to another embodiment of the present disclosure may calculate the electric potential of the DC terminal neutral point, based on the first DC voltage detected by the first voltage detector and the second DC voltage detected by the second voltage detector, and may calculate the electric potential of the motor neutral point, based on the first current detected by the first current detector or the second current detected by the second current detector. Accordingly, the electric potential between the motor neutral point and the DC terminal neutral point may be the same or different.

Meanwhile, when driving only the single-phase motor, all of upper switching elements of the inverter are turned on, or all of lower switching elements of the inverter are turned on. Accordingly, only the single-phase motor among a plurality of motors serially connected with each other can be stably driven, by using a single inverter.

In addition, as all of the upper switching elements or the lower switching elements of the inverter are turned on, the level of current flowing through the plurality of switching elements that are turned on can be lowered, thereby improving the lifespan of the switching elements in the inverter.

When driving only the single-phase motor, a phase of a current flowing in each phase of the multi-phase motor is the same. Accordingly, the effective current flowing through the multi-phase motor becomes zero, and the multi-phase motor does not rotate.

When driving only the single-phase motor, a sum of a current flowing in each phase of the multi-phase motor flows in the single-phase motor. Accordingly, the multi-phase motor does not rotate, and only the single-phase motor rotates stably.

When all of the upper switching elements of the inverter are turned on, or when all of the lower switching elements of the inverter are turned on, a level of a current flowing in the single-phase motor is greater than a level of a current flowing in each phase of the multi-phase motor. Accordingly, the multi-phase motor does not rotate, and only the single-phase motor rotates stably.

When driving only the single-phase motor, a first input current is input to the multi-phase motor, and an effective current flowing through the multi-phase motor is zero, and a second input current is input to the single-phase motor, and the effective current flowing through the multi-phase motor is the second input current. Accordingly, the multi-phase motor does not rotate, and only the single-phase motor rotates stably.

When driving at least the multi-phase motor among the single-phase motor and the multi-phase motor, a part of the upper switching elements of the inverter are turned on, and remaining part are turned off, or a part of the lower switching elements of the inverter are turned on, and remaining part are turned off. Accordingly, an effective current flows through the multi-phase motor, and eventually, at least the multi-phase motor can stably rotate.

The multi-phase motor comprises a fan motor, and the single-phase motor comprises a pump motor. Accordingly, a plurality of motors serially connected with each other can be stably driven, by using a single inverter.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device for driving a plurality of motors, the device comprising:

an inverter electrically connected to a first end and a second end of a DC terminal;
a multi-phase motor electrically connected to the inverter;
a single-phase motor electrically connected in series with the multi-phase motor; and
a first capacitor and a second capacitor electrically connected in series between the first end and the second end of the DC terminal,
wherein the single-phase motor is electrically connected to a node between the first capacitor and the second capacitor.

2. The device of claim 1, wherein a neutral point of the multi-phase motor is electrically connected to a first end of the single phase motor, and
a second end of the single-phase motor is electrically connected to the node between the first capacitor and the second capacitor.

3. The device of claim 1, wherein an input terminal of the single-phase motor and each phase of the multi-phase motor are electrically connected to a common node, and
an output terminal of the single-phase motor is connected to the node between the first capacitor and the second capacitor.

4. The device of claim 1, wherein a neutral point of the multi-phase motor is electrically connected to a first end of the single phase motor, and
a DC terminal neutral point comprising the node between the first capacitor and the second capacitor, is connected to a second end of the single-phase motor.

5. The device of claim 4, wherein the neutral point of the multi-phase motor comprises a node having zero current based on a phase difference in a multi-phase AC system.

6. The device of claim 1, further comprising:
a first current detector configured to detect a first current input to the multi-phase motor; and
a second current detector configured to detect a second current input to the single-phase motor.

7. The device of claim 1, further comprising:
a first voltage detector configured to detect a DC voltage across the first capacitor; and
a second voltage detector configured to detect a DC voltage across the second capacitor.

8. The device of claim 1, further comprising a controller configured to control the inverter, the controller being configured to drive one of:
the single-phase motor and the multi-phase motor at a common speed,
the single-phase motor and the multi-phase motor at different speeds,
only the single-phase motor, or
only the multi-phase motor.

9. The device of claim 8, wherein a number of frequencies of a current input to the multi-phase motor when the single-phase motor and the multi-phase motor are driven at the common speed is greater than a number of frequencies of a current input to the multi-phase motor when the single-phase motor and the multi-phase motor driven at different speeds.

10. The device of claim 9, wherein the number of frequencies of the current input to the multi-phase motor when the single-phase motor and the multi-phase motor are driven at the common speed is one, and
the number of frequencies of the current input to the multi-phase motor when the single-phase motor and the multi-phase motor are driven at different speeds is two or more.

11. The device of claim 9, wherein a current output from the inverter when the single-phase motor and the multi-phase motor are driven at the common speed corresponds to a single sine wave, and
the current output from the inverter when the single-phase motor and the multi-phase motor are driven at different speeds corresponds to a sum of a plurality of sine waves.

12. The device of claim 8, wherein, when the single-phase motor and the multi-phase motor are driven at the common speed, the multi-phase motor and the single-phase motor are driven by an effective current having the same frequency.

13. The device of claim 8, wherein, when the single-phase motor and the multi-phase motor are driven at the same speed, a torque of the multi-phase motor is greater than a torque of the single-phase motor when a maximum level of an effective current of the multi-phase motor and a maximum level of an effective current of the single-phase motor are the same.

14. The device of claim 8, wherein, when the single-phase motor and the multi-phase motor are driven at different speeds, a current through the multi-phase motor is different from a current through the single-phase motor, and
when driving only the multi-phase motor, a current flows through the multi-phase motor, and no current flows through the single-phase motor.

15. The device of claim 8, wherein, when driving only the multi-phase motor, an electric potential between the motor neutral point of the multi-phase motor, and a DC terminal neutral point between the first capacitor and the second capacitor is the same.

16. The device of claim 8, wherein, when the single-phase motor and the multi-phase motor are driven at different speeds, a first current having a first frequency and a second frequency is input to the multi-phase motor, and a second current having the second frequency is input to the single-phase motor, and
when the single-phase motor and the multi-phase motor are driven at the same speed, a third current having a third frequency is input to the multi-phase motor, and a fourth current having the third frequency is input to the single-phase motor.

17. The device of claim 8, wherein, when the single-phase motor is driven, an electric potential between a motor neutral point of the multi-phase motor and a DC terminal neutral point between the first capacitor and the second capacitor is different, and
when driving only the multi-phase motor, an electric potential between the motor neutral point and the DC terminal neutral point is the same.

18. The device of claim 8, wherein, the inverter comprises a plurality of upper switching elements and a plurality of lower switching elements, and wherein, when only the single-phase motor is driven, one of the upper switching elements or the lower switching elements are turned on.

19. An electric apparatus comprising a device for driving a plurality of motors, the device comprising:
an inverter electrically connected to a first end and a second end of a DC terminal;
a multi-phase motor electrically connected to the inverter;
a single-phase motor electrically connected in series with the multi-phase motor; and
a first capacitor and a second capacitor electrically connected in series between the first end and the second end of the DC terminal, wherein the single-phase motor is electrically connected to a node between the first capacitor and the second capacitor.

20. The electric apparatus of claim 19, wherein the multi-phase motor comprises a fan motor, and the single-phase motor comprises a pump motor.

* * * * *